United States Patent
Chesla

(10) Patent No.: US 7,607,170 B2
(45) Date of Patent: Oct. 20, 2009

(54) STATEFUL ATTACK PROTECTION

(75) Inventor: Avi Chesla, Tel-Aviv (IL)

(73) Assignee: Radware Ltd., Tel Aviv (IL)

(*) Notice: Subject to any disclaimer, the term of this patent is extended or adjusted under 35 U.S.C. 154(b) by 783 days.

(21) Appl. No.: 11/018,255

(22) Filed: Dec. 22, 2004

(65) Prior Publication Data

US 2006/0137009 A1    Jun. 22, 2006

(51) Int. Cl.
    *G06F 12/14* (2006.01)
    *G08B 23/00* (2006.01)

(52) U.S. Cl. .............................. 726/22; 726/23; 726/24; 726/25; 709/224

(58) Field of Classification Search .................... 726/22, 726/24, 25, 23; 709/224
    See application file for complete search history.

(56) References Cited

U.S. PATENT DOCUMENTS

| | | | |
|---|---|---|---|
| 5,278,901 A | 1/1994 | Shieh et al. | |
| 5,557,742 A | 9/1996 | Smaha et al. | |
| 5,638,490 A | 6/1997 | Eckert et al. | |
| 5,991,881 A | 11/1999 | Conklin et al. | |
| 6,279,113 B1 | 8/2001 | Vaidya | |
| 6,282,546 B1 | 8/2001 | Gleichauf et al. | |
| 6,321,338 B1 | 11/2001 | Porras et al. | |
| 6,370,648 B1 | 4/2002 | Diep | |
| 6,453,345 B2 | 9/2002 | Trcka et al. | |
| 6,487,666 B1 | 11/2002 | Shanklin et al. | |
| 6,535,227 B1 | 3/2003 | Fox et al. | |
| 6,622,135 B1 | 9/2003 | De Tremiolles et al. | |
| 6,715,084 B2 | 3/2004 | Aaron et al. | |
| 6,816,910 B1* | 11/2004 | Ricciulli .................... | 709/237 |
| 7,028,179 B2 | 4/2006 | Anderson et al. | |
| 7,308,715 B2* | 12/2007 | Gupta et al. .................. | 726/23 |
| 7,370,357 B2* | 5/2008 | Sekar ......................... | 726/23 |
| 2002/0059078 A1 | 5/2002 | Valdes et al. | |
| 2002/0083175 A1 | 6/2002 | Afek et al. | |
| 2002/0103916 A1* | 8/2002 | Chen et al. ................. | 709/229 |
| 2002/0107953 A1 | 8/2002 | Ontiveros et al. | |
| 2002/0133586 A1 | 9/2002 | Shanklin et al. | |
| 2002/0162026 A1 | 10/2002 | Neuman et al. | |
| 2003/0009699 A1 | 1/2003 | Gupta et al. | |
| 2003/0014665 A1 | 1/2003 | Anderson et al. | |
| 2003/0046581 A1 | 3/2003 | Call et al. | |
| 2003/0196095 A1 | 10/2003 | Jeffries et al. | |

(Continued)

FOREIGN PATENT DOCUMENTS

JP    2003-218949    7/2003

(Continued)

OTHER PUBLICATIONS

Wang, Haining et al. "Detecting SYN Flooding Attacks", 2002.*

(Continued)

*Primary Examiner*—Michael J Simitoski
(74) *Attorney, Agent, or Firm*—Oblon, Spivak, McClelland, Maier & Neustadt, L.L.P.

(57) ABSTRACT

A method for detecting an attack in a computer network includes monitoring communication traffic transmitted over connections on the network that are associated with a stateful application protocol so as to detect respective states of the connections, and analyzing a distribution of the states so as to detect the attack.

51 Claims, 13 Drawing Sheets

U.S. PATENT DOCUMENTS

| | | |
|---|---|---|
| 2004/0083408 A1 | 4/2004 | Spiegel et al. |
| 2004/0098617 A1 | 5/2004 | Sekar |
| 2004/0111531 A1 | 6/2004 | Staniford et al. |
| 2004/0162994 A1 | 8/2004 | Cohen et al. |
| 2004/0236963 A1 | 11/2004 | Danford et al. |
| 2004/0250124 A1 | 12/2004 | Chesla et al. |
| 2005/0021740 A1 | 1/2005 | Bar et al. |
| 2005/0111460 A1 | 5/2005 | Sahita |

FOREIGN PATENT DOCUMENTS

| | | |
|---|---|---|
| WO | WO 02/45380 | 6/2002 |
| WO | WO 03/050644 | 6/2003 |

OTHER PUBLICATIONS

Peng, Tao et al. "Detecting Distributed Denial of Service Attacks Using Source IP Address Monitoring", Nov. 2002.*

Mirkovic, Jelena. "D-WARD: DDoS Network Attack Recognition and Defense", Jan. 2002.*

Tzerefos, P. et al. "A Comparative Study of Simple Mail Transfer Protocol (SMTP), Post Office Protocol (POP) and X.400 Electronic Mail Protocols", 1997 IEEE.*

Ohsita, Yuichi et al. "Detecting Distributed Denial-of-Service Attacks by analyzing TCP SYN packets statistically", Nov.-Dec., 2004.*

Guo, Fanglu et al. "Traffic Analysis: From Stateful Firewall to Network Intrusion Detection System", Jan. 2004.*

Phillip Andrew Porras, "STAT A State Transition Analysis Tool For Intrusion Detection", University of California, 1992, pp. 1-35.

Koral Ilgun, et al., "State Transition Analysis: A Rule-Based Intrusion Detection Approach", IEEE Transactions on Software Engineering, vol. XX, No. Y, month 1995, pp. 1-22.

C.C. Michael, et al., "Simple, state-based approaches to program-based anomaly detection", ACM Transactions on Information and System Security (TISSEC), vol. 5, issue 3, Aug. 2002, pp. 203-237.

Ho-Yen Chang, et al., "Real-time protocol analysis for detecting link-state routing protocol attacks", ACM Transactions on Information and System Security (TISSEC), vol. 4, issue 1, Feb. 2001, pp. 1-36.

S. T. Eckmann, et al., "STATL: an attack language for state-based intrusion detection", J. Comput. Secur., vol. 10, No. 1-2, 2002, 41 pages.

R. Sekar, et al., "Specification-based Anomaly Detection: A New Approach for Detecting Network Intrusions", CCS '02, Nov. 18-22, 2002, pp. 265-274.

Paul Barford, et al., "A signal analysis of network traffic anomalies", Proceedings of the 2$^{nd}$ ACM SIGCOMM Workshop on Internet Measurement, Session 3, 2002, pp. 71-82.

"Polymorphic Shellcode Engine Using Spectrum Analysis", http://www.phrack.org/phrack, 2005, pp. 1-21.

Dr. Myron L. Cramer, et al., "New Methods of Intrusion Detection using Control-Loop Measurement", Fourth Technology for Information Security Conference, May 16, 1996, pp. 1-8.

C.S. Hood, et al., "Proactive network fault detection", INFOCOM '97, Sixteenth Annual Joint Conference of the IEEE Computer and Communications Societies, Proceedings IEEE, Apr. 7-11, 1997, pp. 1147-1155.

L. J. Kohout, et al., "Activity Profiles for Intrusion Detection", 2002 Annual Meeting of the North American Fuzzy Information Processing Society Proceedings, Jun. 2002, pp. 1-6.

German Florez, et al., "An Improved Algorithm for Fuzzy Data Mining for Intrusion Detection", Proceedings of the 2002 North American Fuzzy Information Processing Society (NAPIPS), Jun. 2002, 5 pages.

Levent Ertoez, et al., "Detection and Summarization of Novel Network Attacks Using Data Mining", AHPCRC Technical Report, 2003, 20 pages.

Milos Manic, et al., "Fuzzy Preference Approach for Computer Network Attack Detection", IEEE, 2001, pp. 1345-1349.

John E. Dickerson, et al., "Fuzzy Network Profiling for Intrusion Detection", Proceedings of NAFIPS 19$^{th}$ International Conference of the North American Fuzzy Information Processing Society, Jul. 2000, 6 pages.

Barry Irwin, "Reclaiming one's bandwidth: Dynamic filtering of traffic based on packet payload content", Jun. 2000, 4 pages. http://homes.cs.ru.ac.za/B.Irwin/research/Barry_irwin-dynamic-filtering_SACLA2002.pdf.

"Characterizing and Tracing Packet Floods Using Cisco Routers", Cisco Systems, 1999, pp. 1-8.

"Cert Coordination Center: Denial of Service Attacks", Carnegie Mellon University, 1997, pp. 1-5.

Hung T. Nguyen, et al., "A First Course in Fuzzy Logic", Second Edition Chapman & Hall/CRC, 3 Cover pages, Chapter 1, pp. 1-15, Chapter 2, pp. 19-38, Chapter 5, pp. 83-108, and 129-136, Chapter 13, pp. 319-332, Jul. 1999.

"Fuzzy Logic Toolbox For Use with MATLAB", User's Guide Version 2, The Math Works Inc., Natick, MA Jul. 2002, Cover pp. 4, I-VIII, pp. (1)-(1-14), and (2) (2-57).

J. Wesley Hines, "Fuzzy and Neural Approaches in Engineering", Wiley-Interscience Publications, Jan. 1997, Cover pp. 1-3, 5-52.

Mathew M. Williamson, "Throttling Viruses: Restricting Propagation to defeat Malicious Mobile Code", 2002, Cover pp. 1, pp. 1-6.

Jaime Twycross, et al., "Implementing and Testing a Virus Throttle", Jaime@milieu3.net, matthew.williamson@hp.com, 2003, pp. 1-9.

Avi Chesla, "Using a Spectrum Analyzer to Accurately Detect Misuse of TCP Resources and Malicious Activity on Data Networks", Jun. 10, 2003, V-Secure, 11 Pages.

"PacketShaper® Features (for Packetwise 5.2)" Document version dated Feb. 20, 2002. http://www.packetshaper.com/documentation/packetguide/5.3.0/documents/psFeatures.pdf.

* cited by examiner

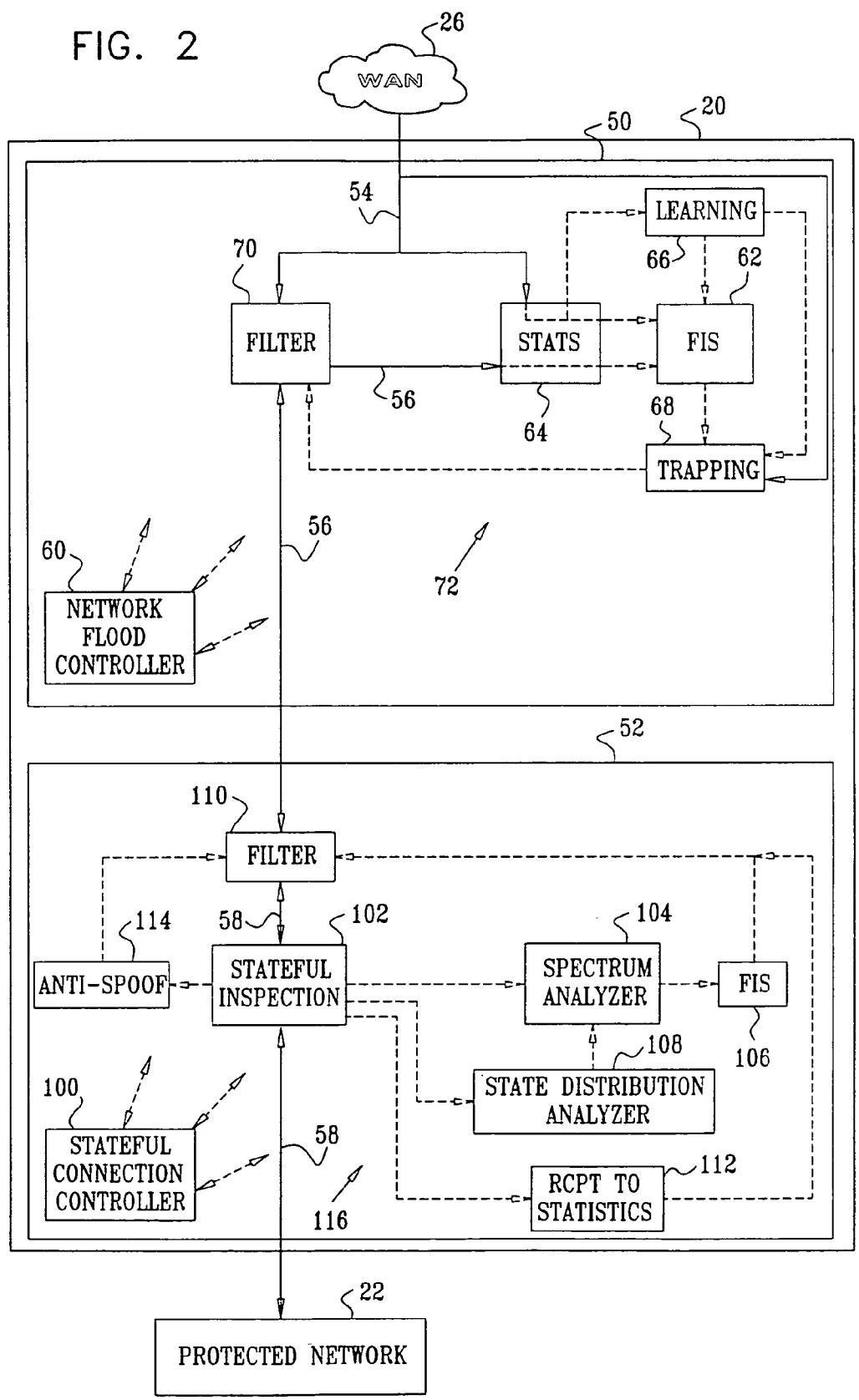

FIG. 4A
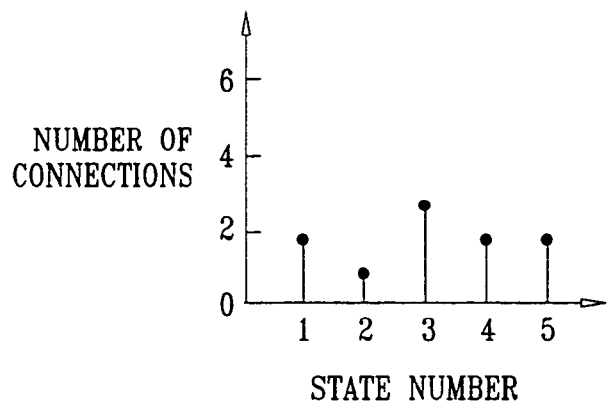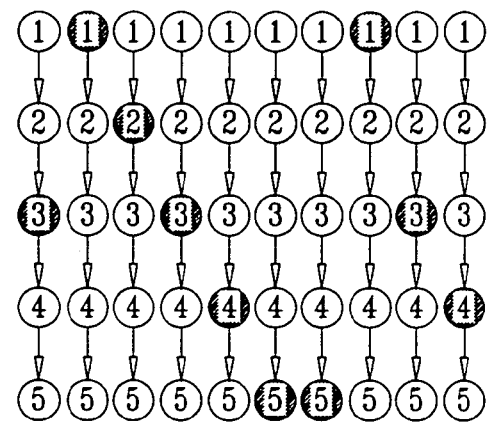
FIG. 4B
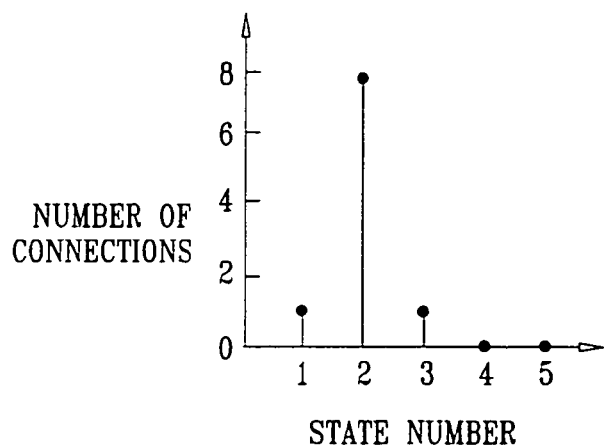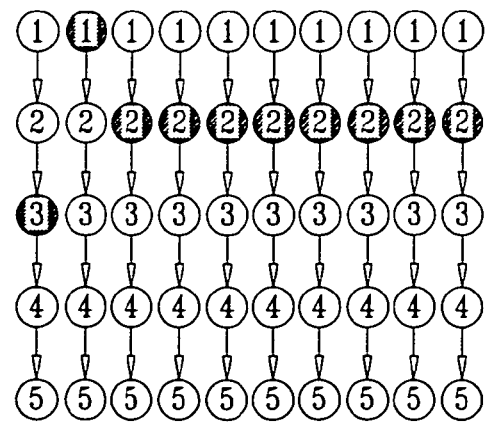

FIG. 9A

| STATE | ATTACK INDICATED | I>M AND $SI_{MAX}$>S? | TIC>U? | STABIL COUNTER>T? | ATTACK CEASED? | ACTION | FEEDBACK |
|---|---|---|---|---|---|---|---|
| NON-ATTACK | YES | | | | | TRANSITION TO MISUSE STATE; RESET NON-ATTACK COUNTER | MISUSE STARTED |
| MISUSE | YES | | NO | | | RESET NON-ATTACK COUNTER; INCREMENT TIC | MISUSE CONTINUES |
| MISUSE | YES | NO | YES | | | RESET NON-ATTACK COUNTER; INCREMENT TIC | MISUSE CONTINUES |
| MISUSE | YES | YES | YES | | | RESET TIC; TRANSITION TO BLOCKING STATE; SET STABIL COUNTER TO 4; BLOCK ONE SOURCE FROM SORT BUFFER; RESET CONNECTIONS; RESET STATE EXPIRATION TIME (2) | ATTACK STARTED |
| MISUSE | NO | | | | | | NO ATTACK ACTIVITY AT THE MOMENT (ATTACK WILL BE CLOSED BY NON-ATTACK COUNTER) |
| ... | ... | ... | ... | ... | ... | ... | ... |

FIG. 9B

| STATE | ATTACK INDICATED | I>M AND $SI_{MAX}$>S ? | TIC>U ? | STABIL COUNTER>T ? | ATTACK CEASED ? | ACTION | FEEDBACK |
|---|---|---|---|---|---|---|---|
| BLOCKING | YES | YES | | YES | | BLOCK NEXT TWO ADDRESSES IN SORT BUFFER; UPDATE UPDATE STATE EXP TIME (2); RESET STABIL COUNTER | DISTRIBUTED ATTACK; STABLE NEGATIVE FEEDBACK |
| BLOCKING | YES | YES | | NO | | INCREMENT STABIL COUNTER | DISTRIBUTED ATTACK; STABLE NEGATIVE FEEDBACK |
| BLOCKING | YES | NO | | YES | | TRANSITION TO MISUSE STATE; REMOVE ADDRESSES FROM BLOCK LIST; RESET NON-ATTACK COUNTER | NO ADDRESS WITH ENOUGH INTENSITY TO BLOCK; MISUSE ACTIVATIES |
| BLOCKING | YES | NO | | NO | | INCREMENT STABIL COUNTER | STABLE NEGATIVE FEEDBACK |
| BLOCKING | NO | | | | NO | DO NOTHING | GOOD BLOCKING DECISION (POSITIVE FEEDBACK) |
| BLOCKING | NO | | | | YES | TRANSITION TO MISUSE STATE | ATTACK STOPPED FEEDBACK |

STATEFUL ATTACK PROTECTION

FIELD OF THE INVENTION

The present invention relates generally to computer networks, and specifically to methods and apparatus for protecting networks from malicious traffic.

BACKGROUND OF THE INVENTION

Computer networks often face malicious attacks originating from public networks. Such attacks currently include pre-attack probes, worm propagation, network flooding attacks such as denial of service (DoS) and distributed DoS (DDoS) attacks, authorization attacks, and operating system and application scanning. In order to evade detection, attackers may utilize spoofed IP addresses.

DoS and DDoS attacks dispatch large numbers of network packets or application requests, in order to overwhelm victim bandwidth, network resources, and/or victim servers, resulting in denial of services to legitimate users. Examples of DoS/DDoS attacks include Internet Control Message Protocol (ICMP) flood attacks, User Datagram Protocol (UDP) flood attacks, and Transmission Control Protocol (TCP) SYN flood attacks.

Some attacks are stateless, i.e., the attacker does not attempt to establish a connection with a particular host, but rather attempts to generally flood the victim network with packets. Other attacks are stateful. In these stateful attacks, the attacker establishes multiple connections with a victim host, by sending packets that conform to protocol standards. The attacker leaves these connections open, typically by completing only a portion of the protocol handshake. The open connections consume resources of the host indefinitely, or until the host times out the connections.

Some stateful attacks are executed at the transport layer (Layer 4 of the OSI network model). For example, during a Transmission Control Protocol (TCP) SYN flood attack, an attacker sends multiple SYN packets from one or more spoofed addresses to a victim host. The victim host responds to each SYN packet by sending a SYN/ACK packet to the spoofed address, and opens a SYN_RECVD state, which consumes host CPU resources. The attacker never responds with the expected ACK packet. As a result, the host's resources are consumed and unavailable for legitimate operations.

Other stateful attacks are executed at the application layer (Layer 7). Such application layer stateful attacks include, for example, SMTP (Simple Mail Transfer Protocol), POP (Post Office Protocol), IMAP (Internet Message Access Protocol), and FTP (File Transfer Protocol) attacks. In these attacks, the attacker typically leaves the host server waiting indefinitely in one of the states, such as one of the handshake states, or until the host server times out the connection.

Application layer stateful attacks also include the "RCPT TO" attack. In this attack, an attacker sends an SMTP mail message having a large number of recipients, as indicated by the repetition of the RCPT TO command of the SMTP protocol. This attack sometimes serves as a DoS attack. The large number of recipients consumes the resources of the victim host (typically an SMTP mail server), degrading performance and sometimes causing the host to fail. The attacker may also launch an RCPT TO attack in order to send spam to a large number of recipients within the victim network, or to scan the victim network to collect information for subsequent attacks.

Common systems used to protect networks at their peripheries include firewalls and network intrusion/prevention detection systems (IDSs/IPSs). Firewalls examine packets arriving at an entry to the network in order to determine whether or not to forward the packets to their destinations. Firewalls employ a number of screening methods to determine which packets are legitimate. IDSs/IPSs typically provide a static signature database engine that includes a set of attack signature processing functions, each of which is configured to detect a specific intrusion type. Each attack signature is descriptive of a pattern which constitutes a known security violation. The IDS monitors network traffic by sequentially executing every processing function of a database engine for each data packet received over a network.

U.S. Pat. No. 6,487,666 to Shanklin et al., which is incorporated herein by reference, describes a method for describing intrusion signatures, which are used by an intrusion detection system to detect attacks on a local network. The signatures are described using a "high level" syntax having features in common with regular expression and logical expression methodology. These high level signatures may then be compiled, or otherwise analyzed, in order to provide a process executable by a sensor or other processor-based signature detector.

U.S. Pat. No. 6,279,113 to Vaidya, which is incorporated herein by reference, describes a signature-based dynamic network IDS, which includes attack signature profiles that are descriptive of characteristics of known network security violations. The attack signature profiles are organized into sets of attack signature profiles according to security requirements of network objects on a network. Each network object is assigned a set of attack signature profiles, which is stored in a signature profile memory together with association data indicative of which sets of attack signature profiles correspond to which network objects. A monitoring device monitors network traffic for data addressed to the network objects. Upon detecting a data packet addressed to one of the network objects, packet information is extracted from the data packet. The extracted information is utilized to obtain a set of attack signature profiles corresponding to the network object based on the association data. A virtual processor executes instructions associated with attack signature profiles to determine if the packet is associated with a known network security violation. An attack signature profile generator is utilized to generate additional attack signature profiles configured for processing by the virtual processor in the absence of any corresponding modification of the virtual processor.

U.S. Pat. No. 6,453,345 to Trcka et al., which is incorporated herein by reference, describes a network security and surveillance system that passively monitors and records the traffic present on a local area network, wide area network, or other type of computer network, without interrupting or otherwise interfering with the flow of the traffic. Raw data packets present on the network are continuously routed (with optional packet encryption) to a high-capacity data recorder to generate low-level recordings for archival purposes. The raw data packets are also optionally routed to one or more cyclic data recorders to generate temporary records that are used to automatically monitor the traffic in near-real-time. A set of analysis applications and other software routines allows authorized users to interactively analyze the low-level traffic recordings to evaluate network attacks, internal and external security breaches, network problems, and other types of network events.

U.S. Pat. No. 6,321,338 to Porras et al., which is incorporated herein by reference, describes a method for network surveillance, the method including receiving network packets handled by a network entity and building at least one longterm and a least one short-term statistical profile from a measure of the network packets that monitors data transfers, errors, or network connections. A comparison of the statistical profiles is used to determine whether the difference between the statistical profiles indicates suspicious network activity.

U.S. Pat. No. 5,991,881 to Conklin et al., which is incorporated herein by reference, describes techniques for network surveillance and detection of attempted intrusions, or intrusions, into the network and into computers connected to the network. The system performs: (a) intrusion detection monitoring, (b) real-time alert, (c) logging of potential unauthorized activity, and (d) incident progress analysis and reporting. Upon detection of any attempts to intrude, the system initiates a log of all activity between the computer elements involved, and sends an alert to a monitoring console. When a log is initiated, a primary surveillance system continues to monitor the network. The system also starts a secondary monitoring process, which interrogates the activity log in real-time and sends additional alerts reporting the progress of the suspected intruder.

U.S. Pat. No. 6,282,546 to Gleichauf et al., which is incorporated herein by reference, describes a system and method for real-time insertion of data into a multi-dimensional database. The system includes a multi-dimensional database and a user interface operable to access and provide views into the multi-dimensional database. A data insertion engine is coupled to and operable to access the multi-dimensional database. The data insertion engine is further operable to receive and process a real-time data feed and to insert data into the multi-dimensional database responsive to processing of the real-time data feed. In one embodiment, the real-time data feed can represent exploited network vulnerabilities, and the system can be used for network intrusion detection and vulnerability assessment.

U.S. Pat. No. 5,278,901 to Shieh et al., which is incorporated herein by reference, describes a pattern-oriented intrusion detection system and method that defines patterns of intrusion based on object privilege and information flow in secure computer systems to detect actual intrusion occurrences. The system is described as being able to track both information and privilege flows within a system, and to uniformly define various types of intrusion patterns.

U.S. Pat. No. 6,535,227 to Fox et al., which is incorporated herein by reference, describes a graphical user interface for determining the vulnerability posture of a network. A system design window displays network items of a network map that are representative of different network elements contained within the network. The respective network icons are linked together in an arrangement corresponding to how network elements are interconnected within the network. Selected portions of the network map turn a different color indicative of a vulnerability that has been established for that portion of the network after a vulnerability posture of the network has been established.

U.S. Pat. No. 6,370,648 to Diep, which is incorporated herein by reference, describes techniques for detecting harmful or illegal intrusions into a computer network or into restricted portions of a computer network. The techniques use statistical analysis to match user commands and program names with a template sequence. Discrete correlation matching and permutation matching are used to match sequences. The result of the match is input to a feature builder and then a modeler to produce a score. The score indicates possible intrusion. A sequence of user commands and program names and a template sequence of known harmful commands and program names from a set of such templates are retrieved. A closeness factor indicative of the similarity between the user command sequence and a template sequence is derived from comparing the two sequences. The user command sequence is compared to each template sequence in the set of templates thereby creating multiple closeness or similarity measurements. These measurements are examined to determine which sequence template is most similar to the user command sequence. A frequency feature associated with the user command sequence and the most similar template sequence is calculated. It is determined whether the user command sequence is a potential intrusion into restricted portions of the computer network by examining output from a modeler using the frequency feature as one input.

US Patent Application Publications 2002/0107953 to Ontiveros et al. and 2002/0133586 to Shanklin et al., which are incorporated herein by reference, describe a method for protecting a network by monitoring both incoming and outgoing data traffic on multiple ports of the network, and preventing transmission of unauthorized data across the ports. The monitoring system is provided in a non-promiscuous mode and automatically denies access to data packets from a specific source based upon an associated rules table. All other packets from sources not violating the rules are allowed to use the same port. The system provides for dynamic writing and issuing of firewall rules by updating the rules table. Information regarding the data packets is captured, sorted and cataloged to determine attack profiles and unauthorized data packets.

US Patent Application Publication 2002/0083175 to Afek et al., which is incorporated herein by reference, describes techniques for protecting against and/or responding to an overload condition at a victim node in a distributed network. The techniques include diverting traffic otherwise destined for the victim node to one or more other nodes, which can filter the diverted traffic, passing a portion of the traffic to the victim node, and/or effect processing of one or more of the diverted packets on behalf of the victim.

US Patent Application Publication 2003/0014665 to Anderson et al., which is incorporated herein by reference, describes apparatus and a method for an automated response to a DDoS attack. The method includes receiving notification of a DDoS attack by an Internet host, which, responsively thereto, establishes security authentication from an upstream router from which the attack traffic, transmitted by one or more host computers, is received. The Internet host then transmits filter(s) to the upstream router generated based upon characteristics of the attack traffic. Once installed by the upstream router, the attack traffic is dropped to terminate the DDoS attack. In one embodiment, monitoring of the network traffic received by the Internet host is performed using pattern recognition, such as fuzzy logic, which can be trained to determine normal traffic levels. Based on the normal average traffic levels, the fuzzy logic can determine when traffic levels go above a pre-determined amount or threshold from the normal level in order to detect a DDoS attack.

US Patent Application Publication 2003/0009699 to Gupta et al., which is incorporated herein by reference, describes a method for detecting intrusions on a computer, including the step of identifying an internet protocol field range describing fields within internet protocol packets received by a computer. A connectivity range is established which describes a distribution of network traffic received by the computer. An internet protocol field threshold and a connectivity threshold are then determined from the internet protocol field range and connectivity range, respectively. During the operation of the computer, values are calculated for the internet protocol field range and connectivity range. These values are compared to the internet protocol metric threshold and connectivity metric threshold so as to identify an intrusion on the computer.

US Patent Application Publication 2003/0046581 to Call et al., which is incorporated herein by reference, describes an intelligent cache management system for protecting network devices from overload and from network packet flood attacks (such as DoS and DDoS attacks). The system frees allocated resources (memory, in particular) for reuse, when under sustained attack. In an embodiment, the system is used in connection with session-type packet processing devices of a computer network. The system comprises a memory management database for storing communication traffic classification and memory threshold values, and a memory monitor for tracking overall memory usage and determining when the memory threshold values stored in the memory management database are reached. A cache classifier is used to determine a class into which a given session of communications traffic falls. When the memory threshold value is reached, a pruning mechanism selects and prunes entries representing sessions on the packet processing device in accordance with the communication traffic classification and memory thresholds programmed in the memory management database.

US Patent Application Publication 2002/0162026 to Neuman et al., which is incorporated herein by reference, describes apparatus and a method for providing secure network communication. Each node or computer on a network has a secure, intelligent network interface with a coprocessor that handles all network communication. The intelligent network interface encrypts outgoing packets and decrypts incoming packets from the network based on a key and algorithm managed by a centralized management console on the network. The intelligent network interface can also be configured by the management console with dynamically distributed code to perform authentication functions, protocol translations, single sign-on functions, multi-level firewall functions, distinguished-name based firewall functions, centralized user management functions, machine diagnostics, proxy functions, fault tolerance functions, centralized patching functions, Web-filtering functions, virus-scanning functions, auditing functions, and gateway intrusion detection functions.

US Patent Application Publication 2002/0059078 to Valdes et al., which is incorporated herein by reference, describes probabilistic correlation techniques for increasing sensitivity, reducing false alarms, and improving alert report quality in intrusion detection systems. In an embodiment, an intrusion detection system includes at least two sensors to monitor different aspects of a computer network, such as a sensor that monitors network traffic and a sensor that discovers and monitors available network resources. The sensors are correlated in that the belief state of one sensor is used to update or modify the belief state of another sensor. In another embodiment, probabilistic correlation techniques are used to organize alerts generated by different sensors in an intrusion detection system. By comparing features of each new alert with features of previous alerts, rejecting a match if a feature fails to meet or exceed a minimum similarity value, and adjusting the comparison by an expectation that certain feature values will or will not match, the alerts can be grouped in an intelligent manner.

PCT Publication WO 02/45380 to Copeland, which is incorporated herein by reference, describes a flow-based intrusion detection system for detecting intrusions in computer communication networks. Data packets representing communications between hosts in a computer-to-computer communication network are processed and assigned to various client/server flows. Statistics are collected for each flow. The flow statistics are analyzed to determine if the flow appears to be legitimate traffic or possible suspicious activity. A concern index value is assigned to each flow that appears suspicious. By assigning a value to each flow that appears suspicious and adding that value to the total concern index of the responsible hosts it is possible to identify hosts that are engaged in intrusion activity. When the concern index value of a host exceeds a preset alarm value, an alert is issued and appropriate action can be taken.

SUMMARY OF THE INVENTION

In embodiments of the present invention, a dynamic network security system detects and filters malicious traffic entering a protected network. The security system protects at least one computer, such as a server, running a stateful communication application within the protected network. Typical protected applications include SMTP, POP, IMAP, and FTP server applications. The system analyzes the distribution of the states of network connections among the possible states of the communication application in order to detect that a stateful attack is in progress. The system typically interprets deviations of the distribution from a baseline distribution of the states as indicative of the occurrence of the attack. For some protocols, including SMTP, under ordinary, non-attack conditions, the states are approximately uniformly distributed.

Typically, upon detection of an attack, the system filters incoming packets to block the attack. In some embodiments, the system uses a feedback control loop in order to determine the effectiveness of the filtering and to adjust the filtering rules appropriately.

In some embodiments of the present invention, the security system additionally performs stateful inspection by applying signal processing techniques to perform real-time spectral analysis of traffic patterns of at least one computer within the protected network. The system analyzes the results of the spectral analysis using adaptive fuzzy logic algorithms, in order to detect stateful flood attacks. Upon detection of an attack, the system filters incoming packets to block the attack. For some applications, the system makes an attack determination only if an attack is indicated by both spectral analysis and the connection distribution analysis described above. The use of connection distribution analysis typically reduces false positives sometimes identified by spectral analysis, such as when transient wide-area network communications delays increase connection durations.

In some embodiments of the present invention, the security system protects at least one server within the protected network from an excessive recipient attack, such as an "RCPT TO" attack. The system monitors incoming messages, e.g., e-mails, and identifies as malicious any messages specifying a number of recipients greater than an adaptive threshold. The system typically sets the threshold responsively to an average number of recipients specified by messages having an unusually high number of recipients, such as a number of recipients in the top fifth percentile. Alternatively or additionally, the system interprets a cumulative measure of excessive recipients from a single source address, e.g., a source IP address, as indicative that the source address is launching an attack. The security system typically performs this attack protection in conjunction with the spectral analysis and connection distribution analysis protection described above.

In some embodiments, the security system is implemented as a network appliance deployed on the perimeter of the protected network, and may be located outside a firewall that also protects the network. The security system typically comprises several modules and a controller, which coordinates the operations o the modules. These modules generally include at least one attack detection module, at least one signature detection module, and at least one filtering module.

In a disclosed embodiment, the controller implements a finite state machine. The controller makes transitions between states according to predetermined rules, responsively to its current operational state and to real-time input from the modules. The controller is typically connected together with the attack detection module in a feedback loop, and thereby continuously receives input indicating the effectiveness of filtering in light of current attack levels and characteristics.

The security system is adaptive, automatically reacting to changes in characteristics of an attack during the attack's life cycle. Unlike conventional IDSs, the security system does not rely on signature-based attack detection, although such conventional detection methods may be used in conjunction with the novel techniques described above.

There is therefore provided, in accordance with an embodiment of the present invention, a method for detecting an attack in a computer network, including monitoring communication traffic transmitted over connections on the network that are associated with a stateful application protocol so as to detect respective states of the connections, and analyzing a distribution of the states so as to detect the attack.

For some applications, monitoring includes detecting respective handshake states of the connections, and analyzing includes analyzing the distribution of the handshake states so as to detect the attack. For some applications, the stateful application protocol includes Simple Mail Transfer Protocol (SMTP), Post Office Protocol (POP), Internet Message Access Protocol (IMAP), or File Transfer Protocol (FTP).

In an embodiment of the present invention, the method includes filtering traffic entering the network in order to block traffic participating in the attack.

For some applications, analyzing the distribution includes interpreting a number of connections from a single source address that is greater than a threshold value as indicative of the attack.

In an embodiment of the present invention, analyzing the distribution includes interpreting a deviation of the distribution from a baseline distribution of the states as indicative of the attack. For example, analyzing the distribution may include interpreting a disproportionately large number of connections in one of the states compared to the baseline distribution as indicative of the attack.

For some applications, the baseline distribution is a generally uniform distribution of the states, and analyzing the distribution includes interpreting the deviation of the distribution from the generally uniform baseline distribution as indicative of the attack. For example, analyzing the distribution may include interpreting a disproportionately large number of connections in one of the states as indicative of the attack. Alternatively or additionally, analyzing the distribution may include interpreting as indicative of the attack a number of connections in one of the states that is beyond a certain number of standard deviations from an average number of connections in the other states.

For some applications, analyzing the distribution includes calculating an average number of connections for each of the states. Calculating the average number of connections may include calculating the average number of connections for each of the states on an aggregate basis for all source addresses of the traffic. Calculating the average number of connections may include repeatedly calculating the average number for recent traffic. For some applications, calculating the average number of connections includes applying Infinite Impulse Response (IIR) filtering, or calculating the average number using a moving window.

For some applications, the connections are additionally associated with a transport layer protocol, and analyzing the distribution includes: analyzing a pattern of the connections at the transport layer so as to detect a potential attack, and analyzing the distribution of the states so as to make a determination that the potential attack is the attack.

For some applications, analyzing the distribution includes measuring a time-related property of traffic entering the network, transforming the time-related property of the traffic into a frequency domain, and analyzing the distribution of the states and the property in the frequency domain so as to detect the attack. For example, measuring the time-related property may include measuring arrival times of packets, and transforming the time-related property may include determining a spectrum of packet arrival frequency.

There is also provided, in accordance with an embodiment of the present invention, a method for protecting a server on a communication network, the method including:

monitoring messages transmitted over the communication network for forwarding by the server so as to determine a respective number of recipients specified by each of the messages;

identifying a source address of one of the messages for which the number of recipients is equal at least to a threshold;

tracking a cumulative number of the recipients specified in a plurality of the messages from the identified source address; and determining the source address to be malicious responsively to the cumulative number.

For some applications, tracking the cumulative number includes tracking a cumulative excess over the threshold of the number of recipients specified in the plurality of the messages. For some applications, the messages include e-mail messages, for example e-mail messages that are transmitted according to the SMTP protocol.

In an embodiment of the present invention, identifying the source address includes adaptively setting the threshold such that a predetermined percentage of the messages transmitted over the network have a number of recipients greater than or equal to the threshold.

For some applications, the threshold includes a first threshold, and determining the source address to be malicious includes determining that the cumulative number is greater than a second threshold.

In an embodiment of the present invention, the method includes terminating connections to the source address determined to be malicious.

There is further provided, in accordance with an embodiment of the present invention, a method for protecting a server on a communication network, the method including:

monitoring messages transmitted over the communication network for forwarding by the server so as to determine respective numbers of recipients specified by the messages;

adaptively setting an attack threshold responsively to the numbers of the recipients specified by a plurality of the messages; and identifying as malicious one of the messages that specifies a number of recipients that is equal at least to the attack threshold.

For some applications, the network connection is a transport-layer connection, such as a TCP connection. For some applications, the messages include e-mail messages, for example e-mail messages that are transmitted according to the SMTP protocol.

For some applications, adaptively setting the attack threshold includes disregarding messages having a number of recipients greater than a maximum value.

In an embodiment of the present invention, adaptively setting the attack threshold includes adaptively setting a trigger threshold such that a predetermined percentage of the plurality of messages specify a number of recipients greater than or equal to the trigger threshold, and setting the attack threshold responsively to the trigger threshold. For example, the predetermined percentage may be less than or equal to 10%, e.g., less than or equal to 5%.

In an embodiment of the present invention, setting the attack threshold includes, for each of the messages specifying a number of recipients greater than or equal to the trigger threshold, calculating a respective difference between the number of recipients specified by the message and the trigger threshold; and determining the attack threshold responsively to the trigger threshold and an average of the differences. For some applications, determining the attack threshold includes setting the attack threshold equal to a sum of (a) the trigger threshold and (b) a product of (i) the average of the differences and (ii) a constant.

In an embodiment of the present invention, the method includes discarding the message determined to be malicious.

There is still further provided, in accordance with an embodiment of the present invention, apparatus for detecting an attack in a computer network, the apparatus including a network security processor, which is adapted to monitor communication traffic transmitted over connections on the network that are associated with a stateful application protocol so as to detect respective states of the connections, and analyze a distribution of the states so as to detect the attack.

There is additionally provided, in accordance with an embodiment of the present invention, apparatus for protecting a server on a communication network, the apparatus including a network security processor, which is adapted to:

monitor messages transmitted over the communication network for forwarding by the server so as to determine a respective number of recipients specified by each of the messages, identify a source address of one of the messages for which the number of recipients is equal at least to a threshold, track a cumulative number of the recipients specified in a plurality of the messages from the identified source address, and determine the source address to be malicious responsively to the cumulative number.

There is still additionally provided, in accordance with an embodiment of the present invention, apparatus for protecting a server on a communication network, the apparatus including a network security processor, which is adapted to:

monitor messages transmitted over the communication network for forwarding by the server so as to determine respective numbers of recipients specified by the messages, adaptively set an attack threshold responsively to the numbers of the recipients specified by a plurality of the messages, and identify as malicious one of the messages that specifies a number of recipients that is equal at least to the attack threshold.

There is also provided, in accordance with an embodiment of the present invention, a computer software product for detecting an attack in a computer network, the product including a computer-readable medium in which program instructions are stored, which instructions, when read by a computer, cause the computer to monitor communication traffic transmitted over connections on the network that are associated with a stateful application protocol so as to detect respective states of the connections, and analyze a distribution of the states so as to detect the attack.

There is further provided, in accordance with an embodiment of the present invention, a computer software product for protecting a server on a communication network, the product including a computer-readable medium in which program instructions are stored, which instructions, when read by a computer, cause the computer to monitor messages transmitted over the communication network for forwarding by the server so as to determine a respective number of recipients specified by each of the messages, identify a source address of one of the messages for which the number of recipients is equal at least to a threshold, track a cumulative number of the recipients specified in a plurality of the messages from the identified source address, and determine the source address to be malicious responsively to the cumulative number.

There is still further provided, in accordance with an embodiment of the present invention, a computer software product for protecting a server on a communication network, the product including a computer-readable medium in which program instructions are stored, which instructions, when read by a computer, cause the computer to monitor messages transmitted over the communication network for forwarding by the server so as to determine respective numbers of recipients specified the messages, adaptively set an attack threshold responsively to the numbers of the recipients specified by a plurality of the messages, and identify as malicious one of the messages that specifies a number of recipients that is equal at least to the attack threshold.

The present invention will be more fully understood From the following detailed description of embodiments thereof, taken together with the drawings, in which:

BRIEF DESCRIPTION OF THE DRAWINGS

FIG. 2 is a block diagram that schematically illustrates an architecture of a network security system, in accordance with an embodiment of the present invention;

FIGS. 4A and 4B are simplified illustrative examples of ordinary and abnormal state distributions, respectively, in accordance with an embodiment of the present invention;

FIGS. 9A and 9B are a table summarizing actions of the stateful connection controller in various states, in accordance with an embodiment of the present invention;

DETAILED DESCRIPTION OF EMBODIMENTS

Figure 1A:
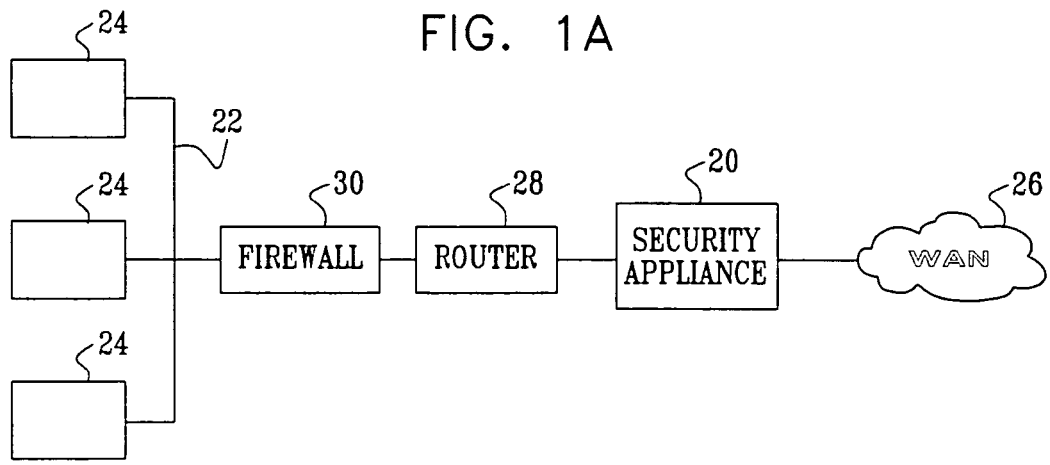
FIGS. 1A and 1B are block diagrams that schematically illustrate a network security system deployed at the periphery of a protected network, in accordance with embodiments of the present invention.
Figure 1B:
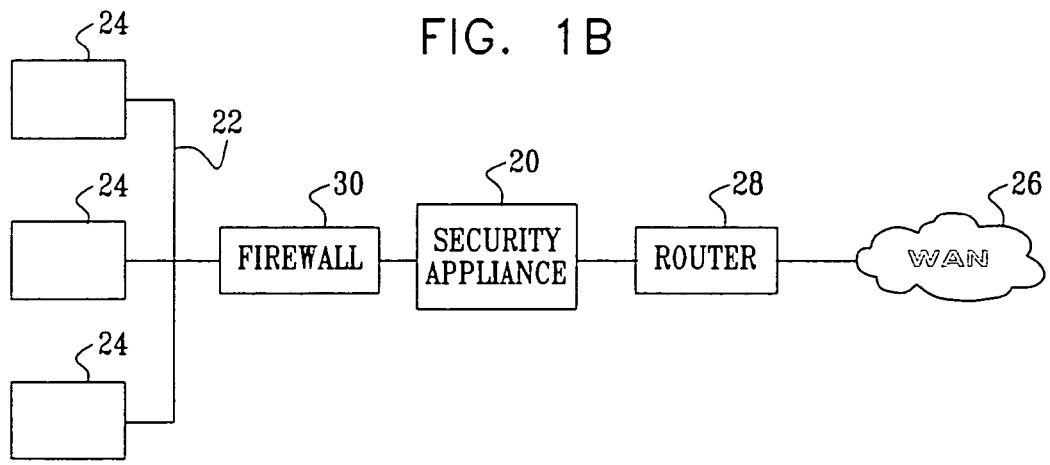

FIGS. 1A and 1B are block diagrams that schematically illustrate a network security system 20 deployed at the periphery of a protected network 22, in accordance with embodiments of the present invention. Protected network 22 comprises various network elements 24, such as servers, clients, routers, switches, and bridges, connected by one or more local-area networks (LANs). Protected network 22 may be a private network, for example, such as an enterprise or campus network. The protected network is connected to a wide-area network (WAN) 26, such as the Internet, through at least one router 28. At least one firewall 30 is typically deployed at the periphery of protected network 22, between the protected network and router 28. Security system 20 may be deployed between router 28 and WAN 26, as shown in FIG. 1A, or between firewall 30 and router 28, as shown in FIG. 1B. Alternatively, system 20 may be deployed between two WANs (configuration not shown).

Figure 1C:
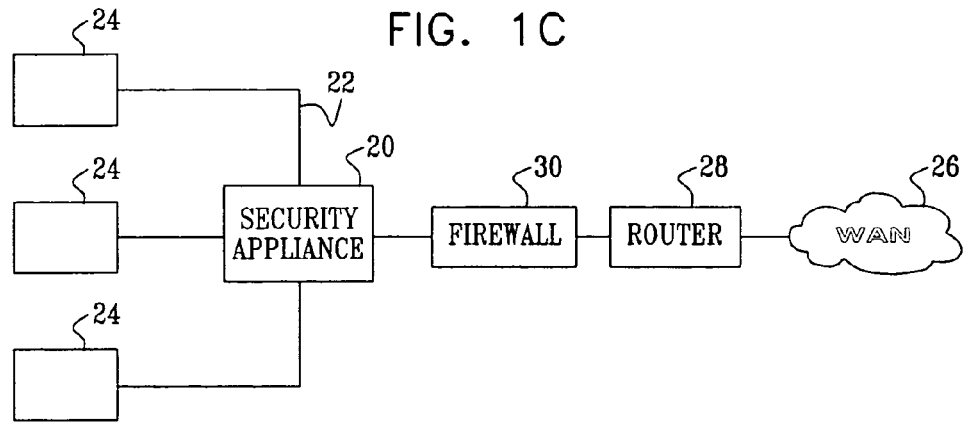
FIGS. 1C and 1D are block diagrams that schematically illustrate a network security system deployed within a protected network, in accordance with embodiments of the present invention.
Figure 1D:
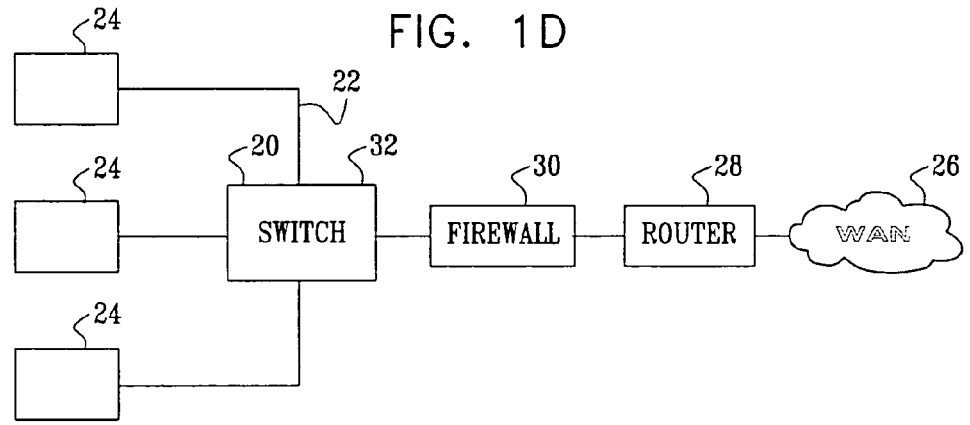

FIGS. 1C and 1D are block diagrams that schematically illustrate network security system 20 deployed within protected network 22, in accordance with embodiments of the present invention. In the configuration shown in FIG. 1C, system 20 is deployed in front of a group of one or more network elements 24, such as in front of a critical server, in order to provide protection to the group of elements from either an external attack or an attack originating within protected network 22. In the configuration shown in FIG. 1D, system 20 is integrated with a switch 32 that connects a group of network elements 24.

Figure 1E:
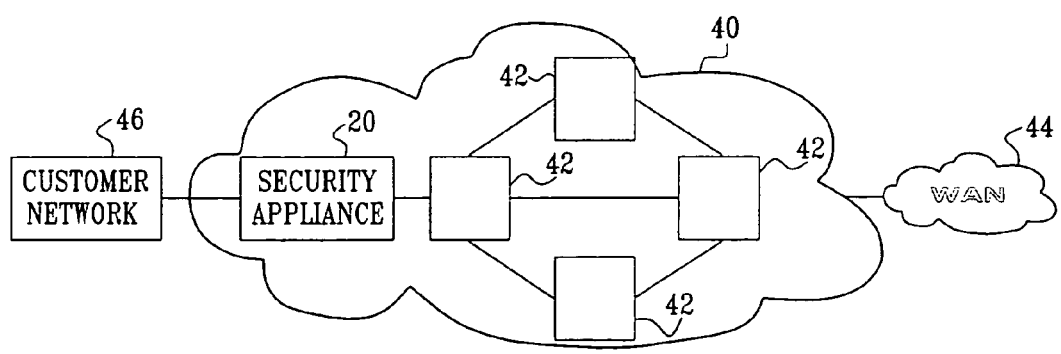
FIG. 1E is a block diagram that schematically illustrates a network security system deployed at the periphery of an Internet Service Provider (ISP) facility, in accordance with an embodiment of the present invention.

FIG. 1E is a block diagram that schematically illustrates network security system 20 deployed at the periphery of an Internet Service Provider (ISP) facility 40, in accordance with an embodiment of the present invention. The ISP facility typically comprises various network elements 42, such as routers, switches, bridges, servers, and clients. ISP 40 is connected to at least one WAN 44, typically the Internet, and many customer networks, such as a customer network 46. ISP 40 typically deploys security system 20 between the periphery of the ISP facility and customer network 46. The ISP may, for example, offer customers the security protection provided by system 20 as a managed service.

Security system 20 is typically implemented as a network appliance. The appliance typically is not assigned an IP address. As a result, the appliance is generally transparent to attackers, and therefore not subject to attack. The appliance typically supports multiple physical interfaces, such as 1000BaseT Ethernet copper or fiber, 100BaseT, and 10BaseT Ethernet, V.35, E1, T1 and T3.

Security system 20 may comprise a general-purpose computer, which is programmed in software to carry out the functions described herein. The software may be downloaded to the computer in electronic form, over a network, for example, or it may alternatively be supplied to the computer on tangible media, such as CD-ROM. Alternatively, security system 20 may be implemented in dedicated hardware logic, or using a combination of hardware and software elements. The security system may be a standalone unit, or it may alternatively be integrated with other communication or computing equipment, such as router 28 or firewall 30, or switch 32, as mentioned above.

FIG. 2 is a block diagram that schematically illustrates an architecture of security system 20, in accordance with an embodiment of the present invention. Security system 20 typically comprises a network flood protection module 50, and a stateful connection protection module 52. Network flood protection module 50 receives unfiltered traffic 54 from WAN 26, and analyzes and filters the traffic to prevent stateless network flood attacks, as described hereinbelow. Network flood protection module 50 passes filtered traffic 56 to stateful connection module 52, which analyzes and further filters traffic 56 to prevent stateful connection attacks, as described hereinbelow. Stateful connection protection module 52 passes further-filtered traffic 58 to protected network 22. Alternatively, in embodiments of the present invention that do not comprise network flood protection module 50, unfiltered traffic 54 passes directly to stateful connection module 52. (Solid lines in the figure represent packet traffic flow, while dashed lines represent control data flow.)

The Network Flood Protection Module

Network flood protection module 50 comprises at least one network flood controller 60, which controls and coordinates the operation of the components of the network flood protection module. Network flood protection module 50 also typically comprises the following components:

- a fuzzy logic inference (FIS) module 62, which uses fuzzy logic to detect attacks;
- a real-time statistics module 64, which collects and analyzes real-time information regarding traffic;
- a learning module 66, which analyzes the collected statistics in order to develop adaptive baseline parameters for use by FIS module 62;
- a trapping module 68, which characterizes attacks detected by FIS module 62, and generates a set of rules based on the characterization; and
- a filtering module 70, which selectively filters incoming packets based on the rules generated by trapping module 68.

FIS module 62, trapping module 68, and filtering module 70 are arranged in a closed feedback loop 72, under the control of network flood controller 60, as described hereinbelow. Network flood protection module 50 typically comprises a separate network flood controller and set of modules for each different type of network flood attack against which the module is configured to protect.

Network flood protection module 50 and its sub-modules typically operate as described in U.S. patent application Ser. No. 10/441,971, filed May 19, 2003, which is assigned to the assignee of the present application and is incorporated herein by reference.

The Stateful Connection Protection Module

Stateful connection protection module 52 comprises at least one stateful connection controller 100, which controls and coordinates the operation of the components of the stateful connection protection module. Module 52 also typically comprises one or more of the following modules:

- a stateful inspection module 102, which tracks all connections between protected elements 24 of protected network 22 and remote elements communicating with the protected network over WAN 26 (FIGS. 1A-1D);

a spectrum analyzer module 104, which aggregates time measurements made by stateful inspection module 102, and transforms the time measurements into the frequency domain;

a fuzzy logic inference (FIS) module 106, which uses fuzzy logic to analyze the frequency domain characteristics that are output by spectrum analyzer module 104, in order to detect transport layer stateful attacks;

a state distribution analyzer 108, which analyzes the distribution of connections among states of each protected element 24 (which are typically application servers), in order to detect application layer stateful attacks;

a RCPT TO statistics module 112, which analyzes RCPT numbers of SMTP connections in order to detect RCPT TO attacks;

a filtering module 110, which selectively filters incoming packets to block attacks, and determines when an attack has terminated;

an anti-spoof module 114, which validates Tp source addresses by confirming the receipt of retransmit SYN packets, as expected from legitimate (non-spoofed) TCP/IP stacks.

Stateful inspection module 102, spectrum analyzer module 104, FIS module 106, state distribution analyzer 108, and filtering module 110 are arranged in a feedback loop 116, under the control of stateful connection controller 100, as described hereinbelow. Stateful connection protection module 52 may comprise a separate controller and set of modules for each different type of network service that the module is configured to protect.

Stateful connection protection module 52 is described hereinbelow as making attack determinations by integrating information from spectrum analyzer 104, FIS module 106, and state distribution analyzer 108. However, in some embodiments of the present invention, stateful connection protection module 52 is configured to make such attack determinations based solely on information from state distribution analyzer 108, or solely on information from spectrum analyzer 104 and FIS module 106.

The Stateful Inspection Module

Figure 3:
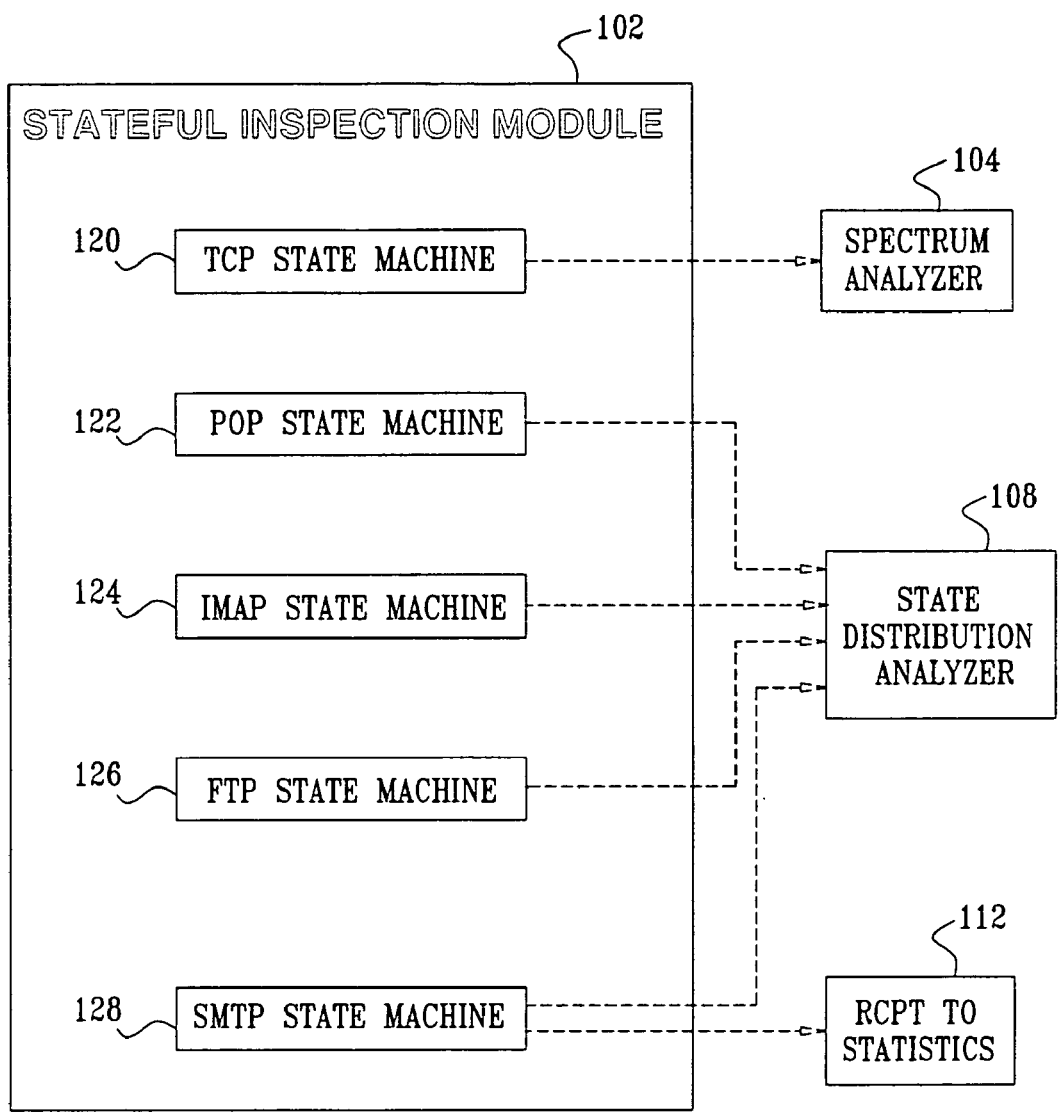
FIG. 3 is a block diagram that schematically illustrates an architecture of a stateful inspection module, in accordance with an embodiment of the present invention.

FIG. 3 is a block diagram that schematically illustrates an architecture of stateful inspection module 102, in accordance with an embodiment of the present invention. Stateful inspection module 102 comprises a TCP state machine 120 and one or more application layer state machines for each type of application that stateful connection protection module 52 protects. Stateful inspection module 102 also comprises related session handlers. Typical application layer state machines include a POP state machine 122, an IMAP state machine 124, an FTP state machine 126, and an SMTP state machine 128. The state machines implemented by module 102 are similar to state machines used in typical implementations of these state machines for their respective protocols. The state machines typically observe the protocol rules as defined in the respective RFC, in order to monitor the states of clients and servers implementing the protocol. For example, TCP state machine 120 is similar to TCP state machines used in typical TCP stack implementations (see, for example, DARPA RFC 793). The state machines of module 102 monitor the states of protected applications and remote elements connected thereto, tracking information such as transitions between states, source IP addresses of connecting clients, and TCP connection information.

TCP state machine 120 tracks all connections between elements 24 of protected network 22 and remote elements communicating with protected network over WAN 26 (FIGS. 1A-1D). The module measures statistics for each connection, such as TCP packet rate (Hz), TCP average load (bytes/packet), and transition frequencies between protocol states both in the transmission and the application layers. The module typically aggregates these statistics once per second. The module passes the aggregated results to spectrum analyzer module 104.

For each connection it tracks, TCP state machine 120 typically records and keeps the following information current in real-time:

source TP address;

destination IP address;

source port;

destination port; and sequence and acknowledgment numbers.

This information enables the stateful inspection module to reset any given TCP connection when directed to do so by the controller. This function may be invoked in blocking state 210, at step 244 of FIG. 7, as described hereinbelow.

The other state machines of stateful inspection module 102 track connections between remote elements and elements 24 of protected network 22 that are running the respective applications of the state machines. The state machines implemented by module 102 are similar to state machines used in typical implementations of the respective applications, as per the respective RFC protocol standards. The state machines measure distribution of state statistics for each connection, and pass these measurements to state distribution analyzer 108, which is described hereinbelow with reference to FIG. 5. (Alternatively, each state machine passes its results to a separate state distribution analyzer 108.) Typically, these measurements include an average number of connections per state by source IP address and in aggregate across all source IP addresses, calculated periodically, such as once per second. In some embodiments of the present invention, SMTP state machine 128 additionally collects RCPT number information, and passes this information to RCPT TO statistics module 112, as described hereinbelow with reference to FIGS. 10 and 11.

The states of state machines in public application servers, such as e-mail and FTP servers, and the clients establishing connection therewith, typically can be grouped into three phases:

the handshake phase, in which a connection is established and authentication information is exchanged, generally includes between 1 and 10 states (including states of both the client and the server), typically no more than 6 states. These states typically consume little processing time of the client and the host.

the content data transmission phase generally includes between 1 and 2 states. These states consume a variable amount of processing time of the client and the host, depending in part on the length of the data. (Some applications, such as FTP, do not include this phase, but instead utilize a separate parallel communications channel.)

the termination phase generally includes between 1 and 2 states. These states typically consume little processing time of the client and the host.

In an embodiment of the present invention, SMTP state machine 128 has seven states, as described in the following table:

| Phase | State Number | State Name | Condition to transition to next state |
|---|---|---|---|
| Handshake | 1 | Reply | Reply code 220 generated by SMTP server |
| | 2 | Listen | HELO/EHLO command generated by SMTP client, and reply code 250 generated by SMTP server |
| | 3 | Helo | MAIL command generated by SMTP client, and reply code 250 generated by SMTP server |
| | 4 | Mail | RCPT TO command generated by SMTP client, and reply code 250/251 generated by SMTP server |
| | 5 | Receipt | DATA command generated by SMTP client, and reply code 354 generated by SMTP server |
| Content | 6 | Data | 250 command generated by SMTP server, and QUIT command generated by SMTP client |
| Termination | 7 | Close | 221 command generated by SMTP server. |

Stateful inspection module 102 enters the reply state (state 1) when a remote client establishes an TCP connection with and attempts to establish an SMTP connection with a protected SMTP server. In the reply state, stateful inspection module 102 listens for a reply code (typically a 220 reply code, as defined in the SMTP RFC) generated by the protected SMTP server, which indicates that the protected service is available. Upon receiving the reply code, stateful inspection module 102 transitions to the second state, the listen state. If stateful inspection module 102 does not receive the reply code, it remains in the REPLY state until the TCP session is terminated or expires. Stateful inspection module 102 makes transitions to the other states based on commands Wand replies generated by the SMTP client and server, as shown in the table. The transition conditions in the table have been simplified for clarity of presentation; additional detail will be apparent to those skilled in the art who have read the present application. Appropriate transitions in response to additional SMTP commands and SMTP reply codes not shown in the table will be evident to those skilled in the art who have read the present application.

Typically, stateful inspection module 102 additionally checks whether each connection is behaving according to protocol standards, and drops packets that do not comply with the standards.

The Spectrum Analyzer Module

Reference is again made to FIG. 2. Spectrum analyzer module 104 uses statistical methods to collect, filter, correlate, and analyze time-series data received from stateful inspection module 102, in order to detect abnormal traffic patterns. Spectrum analyzer module 104 typically performs spectral analysis to derive three features that serve as inputs to FIS module 106: intensity, portion, and noise. Module 104 typically operates as described in the above-mentioned U.S. patent application Ser. No. 10/441,971, in particular with reference to FIGS. 24 and 25 thereof.

The FIS Module

FIS module 106 typically uses fuzzy logic inference methods to derive a single value indicative of a degree of stateful attack (hereinbelow, the "stateful DoA"), which is passed to stateful connection controller 100. FIS module 106 typically uses as inputs parameters that include intensity and portion features output by spectrum analyzer module 104. Module 106 typically operates as described in the above-mentioned U.S. patent application Ser. No. 10/441,971, in particular with reference to FIG. 11 thereof.

The State Distribution Analyzer

State distribution analyzer 108 analyzes the distribution of connections among states of each protected element 24 to detect deviations from baseline distribution. For some protocols, including SMTP, the baseline distribution is generally uniform among at least a portion of the states of the protocol. Such deviations from baseline are interpreted as indicative of a potential stateful application-layer attack. Analyzer 108 typically performs this distribution analysis in aggregate for all source IP addresses connected to a given protected element 24 (which is typically an application server). In addition, the analyzer separately tracks connections-per-state information for each source IP address. Stateful connection controller 102 uses this source IP-specific information in misuse state 204, as described hereinbelow with reference to FIG. 6.

Reference is made to FIGS. 4A and 4B, which are simplified illustrative examples of ordinary and abnormal state distributions, respectively, in accordance with an embodiment of the present invention. For some protocols, including SMTP, under ordinary, non-attack conditions, the duration of each connection in each of the handshake states depends primarily on the processing time of the client and host, and network communication time. Processing time of both the client and host is generally similar (and brief) for each handshake state, and fluctuations in network communication rate affect all states randomly, i.e., they are state-independent. For these protocols, therefore, under ordinary conditions, connections are uniformly distributed among the handshake states, i.e., each state has approximately the same number of connections at any given time. FIG. 4A shows a simplified example of such an ordinary distribution of connections for a protocol, such as SMTP, having a generally uniform distribution of connections.

The expected number of connections in each state can be expressed by the following equation:

$$E(n) = E(r) \cdot E(\Delta t) \qquad \text{(Equation 1)}$$

wherein $E(n)$ is the expected number of simultaneous connections in a given state i at a given point in time, $E(r)$ is the expected current rate of new connections per second (considering only the first packet of a new connection), and $E(\Delta t)$ is the expected mean duration of a connection in a given state. If $r$ and $\Delta t$ are normally distributed, $n$ is also Gaussian. Furthermore, regardless of the distribution of $r$ (i.e., even if the distribution of $r$ is not normal but another arbitrary distribution), $n$ asymptotically approaches a normal distribution over a large number of connections, in accordance with the Central Limit Theorem.

For certain protocols and/or under certain operating conditions, the number of connections $n$ within each state may not be normally distributed. If processing time and communication time are generally state-independent, $\Delta t$ is on average the same for each state. $n$ is therefore on average the same for each state even in the absence of a normal distribution of connections within each state.

Abnormal network communication conditions sometimes cause the sudden termination of communication without proper notification, leaving connections open and the server hanging. Such abnormal conditions often have one of two causes:

- a network communication failure (e.g., a router failure in the Internet), leaving connections open and the server hanging; or
- a stateful application-layer attack, in which an attacking client intentionally terminates communication with a server for connections in a given state without properly notifying the server, leaving the connections open and the server hanging.

When an abnormal condition is caused by a network communication failure, at the moment of failure connections over the failed network route are distributed approximately according to the baseline distribution of all connections among the states. Such a failure thus generally does not affect the distribution of connections among states. For protocols, such as SMTP, that ordinarily have an approximately uniform baselines distribution, each of the states contains approximately an equal number of hung connections (in addition to the average number of uninterrupted connections). As a result, such a failure generally does not affect the overall uniform distribution of connections among states.

On the other hand, when an abnormal condition is caused by an attack, the hung connections generally occur in a single targeted state. As a result, the number of connections in this state becomes disproportionately large compared to baseline. FIG. 4B shows a simplified example of such an abnormal distribution of connections for a protocol such as SMTP, in which the baseline distribution of connections is generally uniform. In this example, the attacking client has terminated connections in state 2.

In other words, for protocols in which the baseline distribution of connections is generally uniform, if the attacking client terminates connections in state $i_a$, connections $n_i$ for states prior to $i_a$ (i.e., states having a state number less than a) can be expressed by the following equation:

$$n_i = (r_n + r_a) \cdot \Delta t \quad \text{(Equation 2)}$$

wherein $r_n$ is the rate of ordinary new connections, $r_a$ is the rate of abnormal new connections generated by the attacking client, and $\Delta t$ is the mean duration of each connection for all monitored states (assuming $\Delta t$ is approximately the same for all monitored states). Connections $n_i$ for state $i_{a+1}$ and states thereafter (i.e., states having a state number greater than a) can be expressed by the following equation:

$$n_i = r_n \cdot \Delta t \quad \text{(Equation 2)}$$

During an attack, $n_i$ for state $i_a$ increases substantially over time, even if $r_a \ll r_n$. As a result, the number of connections $n_i$ for state $i_a$ becomes disproportionately large during an attack compared to uniform baseline.

Figure 5:
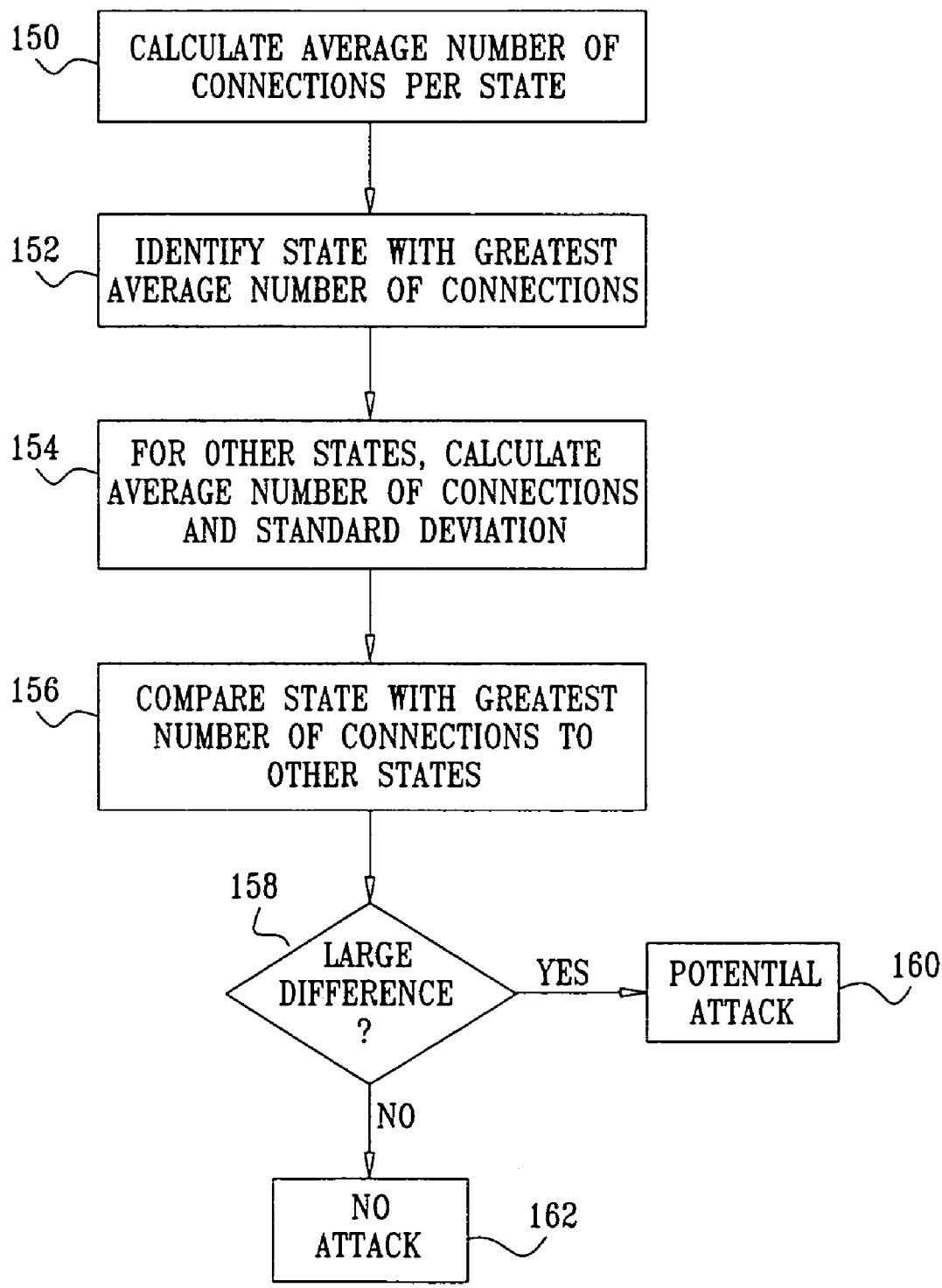
FIG. 5 is a flow chart that schematically illustrates a method for analyzing a state distribution, in accordance with an embodiment of the present invention.

Reference is now made to FIG. 5, which is a flow chart that schematically illustrates a method for analyzing a state distribution, in accordance with an embodiment of the present invention. This method is described for protocols, such as SMTP, which ordinarily have an approximately uniform distribution of connections among monitored states. Appropriate modifications for protocols with non-uniform distributions will be evident to those skilled in the art who have read the present application. State distribution analyzer 108 (FIG. 2) typically performs this method periodically, such as once per second, separately for each application-layer protocol that stateful inspection module 102 is monitoring. Analyzer 108 uses measurements passed periodically (such as once per second) by the state machines of stateful inspection module 102, as described hereinabove with reference to FIG. 3. Analyzer 108 typically performs this method for the handshake states of the monitored applications. For example, analyzer 108 typically monitors states 1 through 5 of SMTP applications. Alternatively or additionally, analyzer 108 performs this method for non-handshake states of the monitored applications, such as termination states.

The method begins at an averaging step 150, in which state distribution analyzer 108 calculates an average number of connections $n_i$ for each monitored state, on an aggregate basis for all source IP addresses. Analyzer 108 typically performs this averaging either by applying Infinite Impulse Response (IIR) filtering, or using a moving window.

Analyzer 108 may apply IRR filtering using the following equation:

$$n_i^{new} = \alpha \cdot n_i^{current} + (1-\alpha) \cdot n_i^{old} \quad \text{(Equation 4)}$$

wherein $n_i$ is the number of connections for state i, and $\alpha$ is determined based on the ratio between the sampling rate (typically once per second) and a characteristic amount of time over which an attack develops, e.g., between about 5 and about 10 seconds. $\alpha$ is typically between 0.602 (for an attack development time of 5 seconds and 0.37 (for an attack development time of 10 seconds). IRR filtering achieves continuous averaging, with statistical weighting of the connection counts decreasing as they become more remote in time.

When analyzer 108 performs the averaging using a moving window, the analyzer typically averages a number m of most recent connection counts. The value of m is typically between about 5 and about 10, and may be calculated using the following equation:

$$m = T_{attack}/\Delta T \quad \text{(Equation 5)}$$

wherein $T_{attack}$ is the characteristic amount of time over which an attack develops, as mentioned above, and $\Delta T$ is the sampling interval. Use of this equation generally produces a value of m that is no greater than $T_{attack}$, so as to avoid failing to detect an attack, or detecting an attack after an unnecessary delay. In addition, the resulting value of m is not so small as to result in random, meaningless averages (when m is too small no trend can be identified).

After calculating the average for each state, state distribution analyzer 108 identifies the state $i_{max}$ having the greatest number of average connections $n^{max}$, at an greatest average identification step 152. For example, analyzer 108 may implement a simple bubble sort algorithm to identify $i_{max}$. At an other state calculation step 152, analyzer 108 calculates the average number of average connections $n^{avr}$ for the states other than state $i_{max}$, and the standard deviation $\sigma$ of the number of connections for the states other than state $i_{max}$:

$$n^{avr} = \frac{1}{n-1} \sum_{i \neq i_{max}} n_i, \quad \text{(Equation 6)}$$

$$\sigma = \sqrt{\frac{1}{n-2} \sum_{i \neq i_{max}} (n_i - n^{avr})^2}. \quad \text{(Equation 7)}$$

At a comparison step 156, analyzer 108 compares $n^{max}$ with $n^{avr}$, such as by using the following equation:

$$n^{max} - n^{avr} \geq k\sigma \quad \text{(Equation 8)}$$

wherein the coefficient k is typically between about 3 and about 10. If, at a check step 158, the difference between $n^{max}$ and $n^{avr}$ is determined to be sufficiently large, stateful connection controller 100 makes a determination that a potential attack is occurring, at a potential attack step 160. On the other hand, if the difference is not sufficiently large, controller 100 determines that no attack is occurring, at a no attack step 162. For some applications, controller 100 makes an attack determination based solely on the results of this analysis performed by state distribution analyzer 108. Alternatively, when making this determination controller 100 additionally considers other indications of a potential attack, such as described hereinbelow with reference to FIG. 7.

The Stateful Connection Controller

Figure 6:
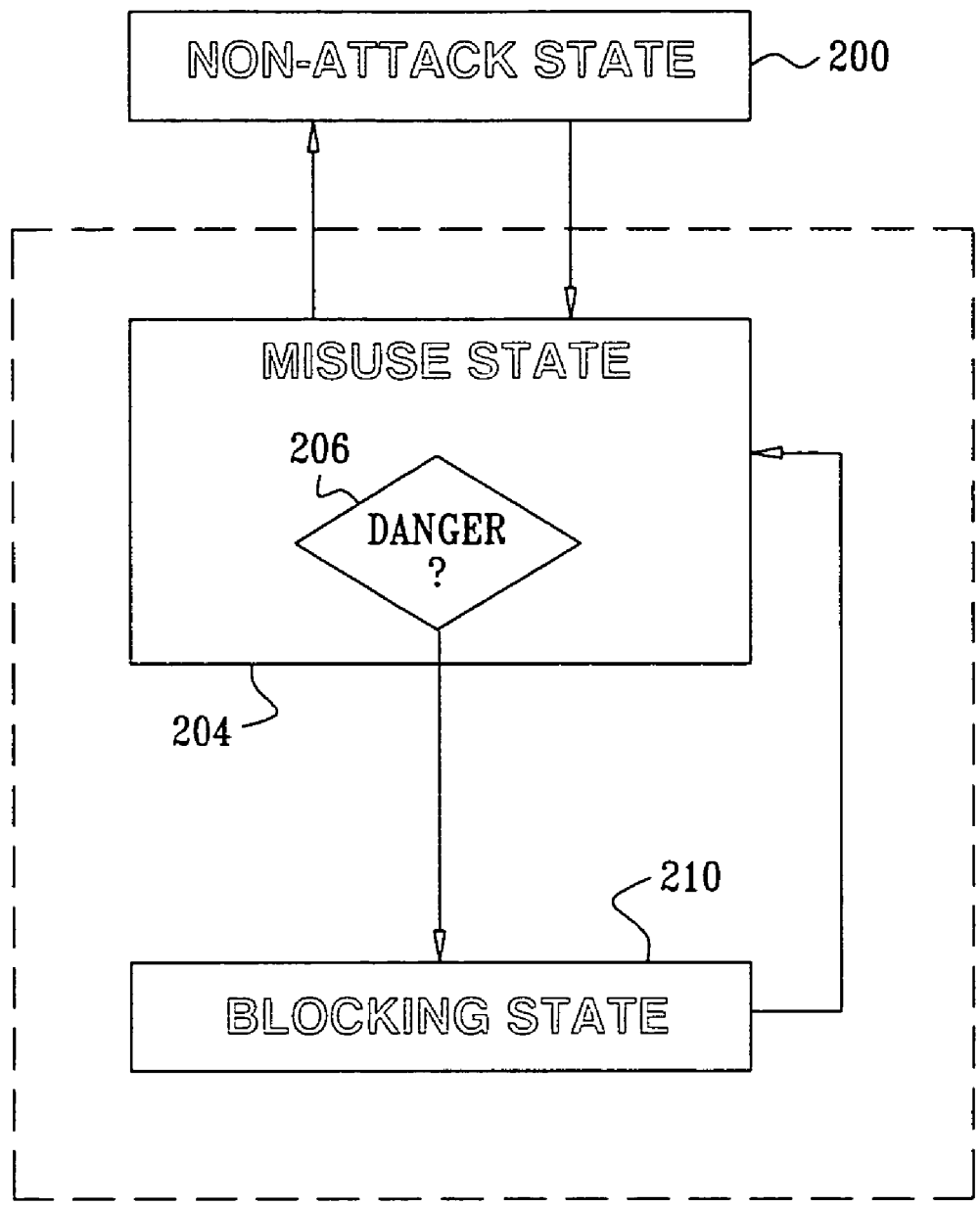
FIG. 6 is a block diagram that schematically illustrates states of a stateful connection controller, in accordance with an embodiment of the present invention.

FIG. 6 is a block diagram that schematically illustrates states of stateful connection controller 100, in accordance with an embodiment of the present invention. Stateful connection controller 100 is typically implemented as a finite state machine. The controller makes transitions between states according to predetermined rules, responsively to its previous operational state and to real-time input from FIS module 106, state distribution analyzer 108, and other modules. As mentioned above, the controller is part of a feedback loop, and therefore continuously receives input from the FIS module in order to determine the effective of filtering in light of current attack levels and characteristics.

Stateful connection controller 100 typically utilizes a number of flags and/or counters, including:

- a stabilization counter (measured in seconds, and referred to in FIGS. 9A and 9B as "TIC"), which is an indication of the stability of an attack degree in misuse state 204, as described hereinbelow. The controller increments the stabilization counter periodically, typically once per second, when the DoA is high in misuse state 204;
- a non-attack counter, which measures continuous seconds of absence of attack in misuse state 204 (the non-attack counter may be implemented as a timer using a scheduler); and
- a consistency counter (measured in seconds, and referred to in FIGS. 9A and 9B as "STABIL"), which is a measure of the consistency of an attack degree in blocking state 210, as described below. The consistency counter thus serves as a measure of negative feedback stability, i.e., indicating the occurrence of a stable, continuing attack. Controller 100 increments the consistency counter periodically, typically once per second, when the DoA is high in blocking state 210. The controller uses the consistency counter and the stabilization counter in generally the same manner, but in different states.

The use of such counters is described herein by way of example and not limitation. Other possible control techniques will be readily apparent to those skilled in the art who have read the present patent application.

The default state of stateful connection controller 100 is a non-attack state 200. Each time the controller enters this state, the controller resets all of the counters and clears the sort buffer, which is described hereinbelow. The controller continuously monitors the output from FIS module 106, which output is indicative of the stateful DoA. When FIS module 106 outputs a DoA value indicative of an attack, the controller transitions to a misuse state 204. Given a range of possible DoA values between 2 and 10, stateful connection controller 100 typically interprets a value of at least 8 as indicative of an attack.

Controller 100 maintains a sort buffer, which is a list of the most dangerous source ID addresses, for each protected service. For each source address in the sort buffer, the sort buffer maintains an intensity counter of the number of misused connections associated with the source address. The controller determines misused connections responsively to the results of the spectrum analysis, as provided by spectrum analyzer module 104. In addition, for each source address in the sort buffer, the sort buffer maintains a set of counters that track the current number of connections for each monitored state of each protected application. Controller 100 updates these counters periodically, typically once per second, using information provided by SMTP state machine 128, described hereinabove with reference to FIG. 3.

During an attack, the controller sorts the sort buffer once per timeframe (typically once per second) according to the intensity counter. The controller typically sorts the source IP addresses in the sort buffer first by intensity counter, and then by greatest number of connections in state $i_{max}$ (described hereinabove with reference to step 152 of FIG. 5). The controller additionally maintains a blocking list, which contains a list of source addresses that are currently blocked by filtering module 110, as described hereinbelow with reference to FIG. 7.

While in misuse state 204, stateful connection controller 100 directs FIS module 106 to periodically determine the stateful DoA, typically once per second. If the DoA indicates that an attack is occurring (e.g., a degree of attack greater than 8 in a range between 2 and 10), the controller increments the stabilization counter and resets the non-attack counter. On the other hand, for each period, typically each second, that the degree of attack indicates that an attack is not occurring (e.g., a degree of attack less than 8), the controller increments the non-attack counter and resets the stabilization counter.

At a danger check step 206, the controller determines whether an attack is occurring. In order to make such an attack determination, the controller typically determines that all of the following conditions are satisfied:

- The stabilization counter reaches a certain threshold, e.g., between about 2 and about 15 seconds, such as 5 seconds, indicating that an attack has continued for this period of time.
- The intensity counter (i.e., the number of misused connections) of the highest-ranked source IP address in the sort buffer exceeds a threshold value M, e.g., between about 10 and about 100 misused connections.
- The condition of Equation 8 ($n^{max} - n^{avr} \geq k\sigma$) is satisfied, as described hereinabove with reference to step 156 of FIG. 5. As noted above, satisfaction of this condition indicates that the distribution of connections, on an aggregate basis for all source IP addresses, is skewed toward one particular state, potentially indicative of an stateful application-layer attack. The use of this condition in combination with the stateful DoA threshold generally serves to reduce false positives that otherwise might be caused by legitimate communications delays.
- The per-state connection counter of state $i_{max}$ of the highest-ranked source address in the sort buffer exceeds a threshold value S, e.g., between about 10 and about 100 connections. (If, at any time, S exceeds the total number of connections currently associated with the source address, S is temporarily reduced to the total number of current connections.) $i_{max}$ is identified as described hereinabove with reference to step 152 of FIG. 5. Satisfaction of this condition generally indicates that the source address is materially participating in the attack.

Upon determination that an attack is occurring, the controller transitions to a blocking state 210. In this state, module 52 blocks stateful connection traffic of a certain type or types, which originates from a certain set of source addresses that are involved (or suspected of being involved) in an attack on the protected network. On the other hand, if, while in misuse state 204, input from module 106 indicates that an attack has not occurred for a certain period of time, e.g., between about 5 and about 20 seconds, as indicated by the non-attack counter, the controller transitions back to non-attack state 200.

Figure 7:
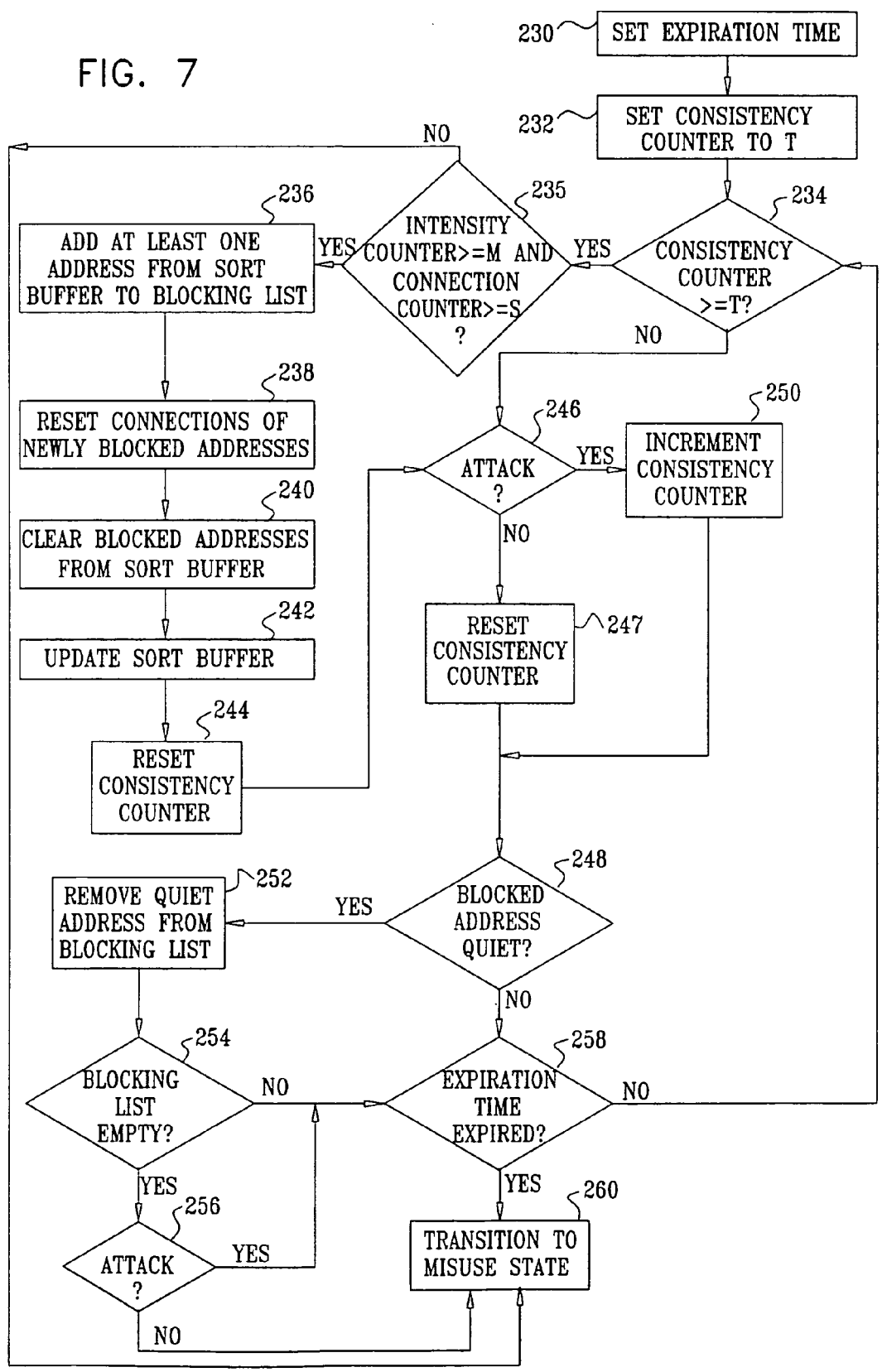
FIG. 7 is a flow chart that schematically illustrates a method performed by a controller while in a blocking state, in accordance with an embodiment of the present invention.

FIG. 7 is a flow chart that schematically illustrates a method performed by controller 100 while in blocking state 210, in accordance with an embodiment of the present invention. Upon entering blocking state 210, the controller sets an expiration time period for blocking state 210, e.g., to between about 60 and about 120 seconds, at an expiration time set step 230. Upon expiration of this period, the controller clears the blocking list and returns to misuse state 204 (FIG. 6). At a set consistency counter step 232, the controller sets the consistency counter equal to a constant T, such as 4. (Setting the consistency counter to T causes the controller to immediately add a first source address to the blocking list, as described below with reference to step 234.) At a consistency counter check step 234, controller 100 determines whether the consistency counter is at least T. A positive indication occurs automatically upon entering blocking state 210, since the consistency counter is set to T at step 232. Subsequently, a positive determination indicates that system 20 has experienced stable negative feedback, i.e., an attack has continued, despite filtering, for at least T seconds. In either case, when the consistency counter is greater than or equal to T, the controller checks, at a check step 235: (a) whether the intensity counter of the highest-ranked source address in the sort buffer exceeds threshold M, and (b) whether the per-state connection counter of state $i_{max}$ of the highest-ranked source address in the sort buffer exceeds threshold S. If the controller finds that either of these conditions is not met, the controller typically returns to misuse state 204 (FIG. 6), at a transition step 260. (The reason for this transition may be that continued ineffective blocking is pointless, and the sort buffer does not contain additional source addresses that are likely to increase the effectiveness of blocking.) If, however, the controller finds that both of these conditions are met, the controller adds one or more source addresses from the sort buffer to the blocking list, at a blocking list addition step 236. When adding these addresses to the blocking list, the controller generally gives priority to addresses in the sort buffer that have the highest intensity counters, determined as described hereinbelow with reference to FIG. 8. If the intensity counters of two or more addresses are equal, the controller generally gives priority to the address having the greatest number of connections in state $i_{max}$, determined as described hereinbelow with reference to FIG. 8. Source addresses on the blocking list are filtered by filtering module 110, as described hereinbelow. For any given attack, the first time the controller adds source addresses to the blocking list (i.e., immediately upon entering blocking state 210), the controller typically adds only a single address. When adding additional addresses during the same attack, the controller typically adds two more addresses each time the consistency counter condition is satisfied at step 234.

After adding the additional addresses to the blocking list, controller 100, at a reset connections step 238, directs stateful inspection module 102 to reset all TCP connections associated with the blocked source addresses (for the relevant protected service). In order to reset the TCP connections, stateful inspection module 102 maintains a table of TCP connection parameters for each source IP address in the sort buffer of controller 100. The connection parameters typically include source port, destination IP address, destination port and TCP sequence, and acknowledge and receiving window numbers. At a clear blocked sources step 240, the controller clears from the sort buffer source addresses that have been added to the blocking list. The controller updates the sort buffer, at an update sort buffer step 242, as described hereinbelow with reference to FIG. 8. The controller then resets the consistency counter, at a reset consistency counter step 244, and proceeds to an attack check step 246, which is described below.

Returning now to step 234, if controller 100 finds at this step that the consistency counter is less than T, the controller periodically, typically once per second, directs module 106 to analyze filtered traffic 58, at attack check step 246. The purpose of this analysis is to determine whether filtering module 110 successfully filtered the attack during the current second. This analysis of the filtered traffic is an implementation of feedback loop 116 (FIG. 2). If the filtering module successfully filtered the attack, the controller resets the consistency counter, at a reset consistency counter step 247. Otherwise, the controller increments the consistency counter, at an increment consistency counter step 250. From both steps 247 and 250, the controller proceeds to a blocked address quiet check step 248, which is described below.

Successful filtering of the attack does not necessarily imply that the attack has ceased. In order to determine whether the attack has ceased, controller 100 monitors each blocked IP address to see whether the TP address has tried (and failed, because of the blocking) to open a new TCP connection to the protected service, at step 248. If the controller determines that one of the blocked IP addresses has not tried to open a TCP connection for at least a threshold period of time, such as between about 5 and about 15 seconds, e.g., 10 seconds, the controller removes the IP address from the blocking list, at a blocking list removal step 252. In addition to enabling a determination that the attack has ceased, as described below, removing inactive TP addresses from the blocking list may decrease the likelihood of blocking legitimate traffic.

Upon removing an address from the blocking list, controller 100 checks whether the blocking list is now empty, at a blocking list empty check step 254. If the blocking list is empty, the controller determines whether the attack has ceased, based on input from FIS module 106, which analyzes the non-filtered traffic, at an attack determination step 256. If the controller finds that the attack has ceased, the controller transitions back to misuse state 204, at transition step 260. (Note that if a new attack has developed while controller 100 is in blocking state 210, the controller will detect the new attack upon returning to misuse state 204.) If the controller finds that the attack has not ceased, the controller checks whether the expiration time set at step 230 has expired, at an expiration check step 258. If the time has expired, even though it may appear that the attack has not ceased, the controller transitions back to misuse state 204, at a transition step 260. Otherwise, the controller returns to step 234 and continues to monitor and react to the attack.

Alternatively, if controller 100 finds at step 254 that the blocking list is not empty, or at step 248 that none of the IP addresses on the blocking list is quiet, the controller checks whether the expiration time set at step 230 has expired, at expiration check step 258, and then takes action accordingly.

Although the steps of the method of FIG. 7 have been described as generally occurring sequentially, this sequential order is presented mainly for the sake of clarity of description. In actual implementations of system 20, a number of the steps, particularly the check steps, generally occur simultaneously.

Figure 8:
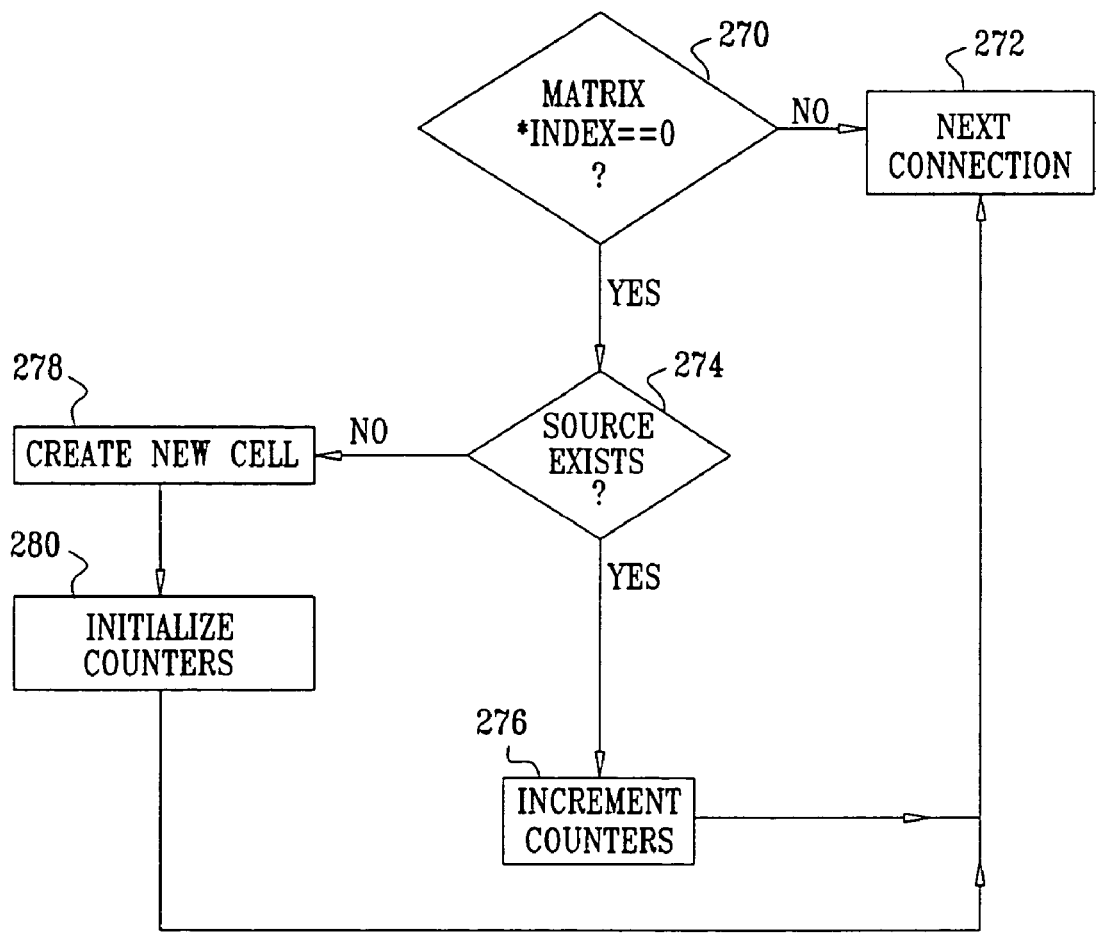
FIG. 8 is a flow chart that illustrates a method for updating a sort buffer, in accordance with an embodiment of the present invention.

FIG. 8 is a flow chart that illustrates a method for updating the sort buffer of controller 100 at step 242 of FIG. 7, in accordance with an embodiment of the present invention. The controller uses this method to count the number of misused TCP connections associated with each unique source address in the sort buffer, and the number of connections associated with each state for the unique source address. The controller periodically, typically once per second, performs this method for each connection tracked by stateful inspection module 102.

At an index check step 270, controller 100 checks whether the matrix index of a connection equals 0. As described in more detail with reference to FIG. 24 of the above-mentioned U.S. patent application Ser. No. 10/441,971, each region (typically, but necessarily, a rectangle) of the spectrum matrix is assigned a unique matrix index. Matrix index 0 is the region characterized by the lowest frequency and payload parameters. System 20 updates the matrix index of each connection during each timeframe (typically once each second). Connections most likely to be dangerous commonly fall in the region of matrix index 0. If the controller finds at step 270 that the index does not equal zero, it goes on to check another connection, at a next connection step 272, until the controller has checked all the connections.

If, however, the matrix index of the connection equals 0, indicating that the connection is potentially misused, the controller checks whether the source address of the connection already exists in the sort buffer, at a source existence check step 274. If the source address already exists in the sort buffer, the controller, at an increment counters step 276: (a) increments the intensity counter of the source address, and (b) increments the source address-specific connection counter associated with the state of the connection. The controller then applies the method to the next connection, at step 272.

On the other hand, if at step 274 the controller determines that the source address does not already exist in the sort buffer, the controller creates a new cell in the sort buffer for the new source address, at a new cell creation step 278. At a counter initialization step 280, the controller: (a) sets the intensity counter for this address to 1, and (b) sets the source address-specific connection counter associated with the state of the connection to 1. The controller then proceeds to the next connection, at step 272.

Once the controller has updated the intensity and per-state connection counters for all connections, the controller sorts the source addresses in the sort buffer according to the intensity counters of the source addresses. If the intensity counters of two or more addresses are equal, the controller additionally sorts these addresses according to the connection counter of state $i_{max}$, as described hereinabove with reference to step 152 of FIG. 5. The controller typically considers the top 10 source addresses as the most likely candidates for blocking, as described hereinabove with reference to step 236 of FIG. 7.

FIGS. 9A and 9B are a table 300 summarizing actions of controller 100 in various states, in accordance with an embodiment of the present invention. The table shows typical actions stateful connection controller 100 takes in each of its states. The first column lists the different states, and the second column indicates whether or not FIS module 62 currently detects an attack, based on analysis of traffic 56, which has not been filtered by filtering module 110. The third column indicates whether (a) the intensity counter (I) of the highest-ranked source address in the sort buffer exceeds a threshold value M, such as between about 10 and about 100 misused connections, and (b) the connection counter of state $i_{max}$ ($S_{imax}$) of the highest-ranked source address in the sort buffer exceeds a threshold value S. The fourth column indicates whether stable negative feedback has been achieved in misuse state 204, based on the value of the stabilization counter, as described hereinabove with reference to FIG. 6. The fifth column indicates whether stable negative feedback has been achieved in blocking state 210, based on the stability counter, as described hereinabove with reference to FIG. 6. The sixth column indicates whether the attack has ceased, as indicated by determining that all source addresses have been removed from the blocking list, as described hereinabove with reference to step 254 of FIG. 7. The remaining columns summarize the actions performed and feedback provided by the controller based on the conditions specified in the first six columns.

The Filtering Module

Filtering module 110 blocks packets from TP addresses included on the current blocking list. Typically, filtering module 110 blocks only TCP SYN packets that attempt to access the attacked stateful application port (e.g., for SMTP, generally port 25). The filtering module is also responsible for determining that an attack has terminated.

The RCPT TO Statistics Module

Figure 10:
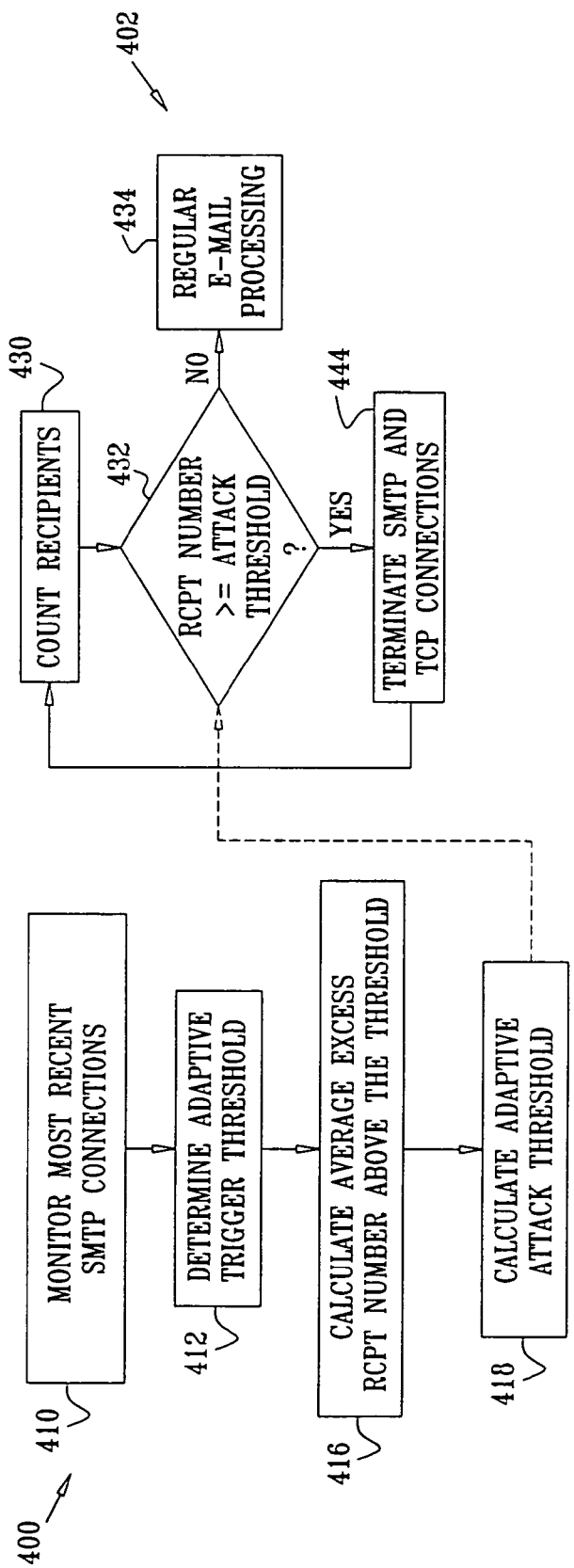
FIG. 10 is a flow chart that schematically illustrates a method for detecting and blocking an RCPT attack, in accordance with an embodiment of the present invention.

Reference is now made to FIG. 10, which is a flow chart that schematically illustrates a method for detecting and blocking an RCPT attack, in accordance with an embodiment of the present invention. The method includes two sub-methods that RCPT TO statistics module 112 (FIG. 2) typically performs substantially in parallel: a parameter determination sub-method 400 and a connection monitoring and blocking sub-method 402. Module 112 uses parameters determined during execution of sub-method 400 for the connection monitoring and blocking of sub-method 402.

Figure 11:
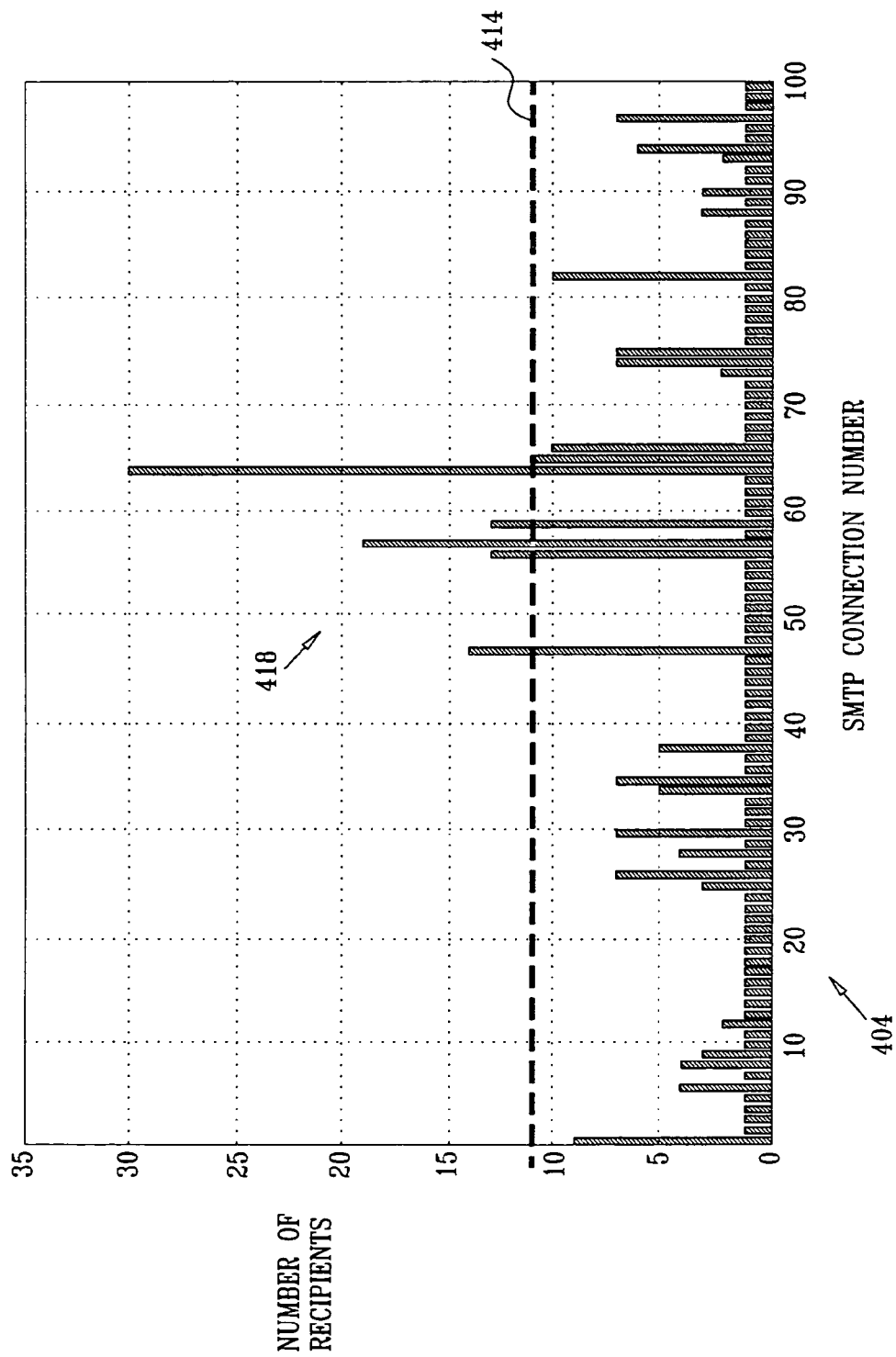
FIG. 11 is a graph showing an exemplary distribution of RCPT numbers of a group of SMTP connections, in accordance with an embodiment of the present invention.

Reference is made to FIG. 11, which is a graph showing an exemplary distribution of RCPT numbers of a group of 100 SMTP connections 404, in accordance with an embodiment of the present invention. During execution of parameter determination sub-method 400 (FIG. 10), module 112 monitors the most recent N SMTP connections received by a protected e-mail server within a protected network, at a connection monitoring step 410. Typically, N is between about 1000 and about 10,000; in the example shown in FIG. 11, N is only 100 for clarity of illustration. Module 112 receives RCPT number information from SMTP state machine 128, as described hereinabove with reference to FIG. 3. During regular operation, module 112 typically executes sub-method 400 substantially continuously. In addition, upon initialization of the system, module 112 typically executes sub-method 400 for N SMTP connections before beginning connection monitoring and blocking sub-method 402, in order to determine initial values for the parameters determined in sub-method 400.

At a trigger threshold determination step 412, module 112 determines an adaptive trigger threshold V, which is indicative of a number of recipients considered unusually high. Typically, module 112 sets V such that SMTP connections having at least V recipients fall within a certain top percentile of connections, such as the top fifth percentile. Typically, module 112 rounds V to the nearest integer. For some applications, when updating V, module 112 disregards SMTP connections whose RCPT number is greater than a maximum value, such as the product of the current V and a constant k, e.g., between about 1 and about 5. By excluding these particularly high RCPT numbers from the determination of V, module 112 reduces the likelihood of adaptation to abnormal SMTP connection activity. In FIG. 11, a line 414 indicates V, which equals 11 in this example.

At an average excess calculation step 416, module 112 calculates an average excess X over V for SMTP connections in the top percentile (these SMTP connections are shown as a group 418 in FIG. 11). Module 112 typically uses the following equation for this calculation:

$$X = <R-V> = \frac{1}{TP}\sum_i R_i - V \quad \text{(Equation 9)}$$

wherein R is the RCPT number of each SMTP connection that falls in the top percentile, TP is the number of SMTP connections in the top percentile, and i is the index of the SMTP connections. Module 112 uses average excess X at step 418, described immediately below. For some applications, when determining X, module 112 disregards SMTP connections whose RCPT number is greater than kV, in order to avoid undesired adaptation, as mentioned above. In the example shown in FIG. 11, TP equals 5, i equals 100, and X equals 6.8 (assuming that all of the SMTP connections have an RCPT number less than kV).

Module 112 calculates an adaptive attack threshold $C^{max}$, at an attack threshold calculation step 418.

Module 112 uses $C^{max}$ at step 442 of sub-method 402, described hereinbelow. $C^{max}$ is typically proportional to average excess X:

$$C^{max} = S \cdot X \qquad \text{(Equation 10)}$$

wherein S is a factor that defines the sensitivity of $C^{max}$. For some applications, high, medium, low, and very low sensitivities of S may correspond to the following respective values of M: 2, 4, 8, and 16.

Reference is again made to FIG. 10. During execution of connection monitoring and blocking sub-method 402, SMTP state machine 128 counts the number of recipients specified by each attempted SMTP connection with the protected server, at a new connection recipient count step 430. At an attack threshold check step 432, module 112 checks whether the RCPT number less trigger threshold V is greater than or equal to attack threshold $C^{max}$, as determined at step 418 of sub-method 400. If the RCPT number is less than $C^{max}$, module 112 takes no action regarding the e-mail, and the e-mail is processed as usual by the e-mail server, at a regular e-mail processing step 434.

On the other hand, if the RCPT number is greater than or equal to $C^{max}$, module 112 directs filtering module 110 of stateful connection protection module 52 to terminate the SMTP connection, by dropping further packets of the connection and terminating its TCP connection, at a termination step 444. After terminating the connection, module 112 returns to step 430, at which it analyzes the next SMTP connection.

In an embodiment of the present invention, the system tracks SMTP connections by their associated source IP addresses, rather than tracking each SMTP connection independently. Upon identifying a source IP address of one of the messages that specifies an excessive number of recipients, the system establishes a counter of the number of excessive recipients for all SMTP connections associated with the source IP address. The system typically calculates excessive recipients by subtracting trigger threshold V from the RCPT count of each SMTP connection having more than V recipients. If the number of excessive recipients from a single source IP address exceeds an adaptive threshold value during a certain time period, the system blocks the source, and terminates all connections therewith. Typically, the adaptive threshold is proportional to average excess X over V, determined as described hereinabove with respect to step 416.

Although the techniques described herein for protection against too-many-recipient e-mail attacks have been described specifically with respect to "RCPT TO" attacks over the SMTP protocol, these techniques may be applied, mutatis mutandis, to protecting against other types of too-many-recipient attacks over other protocols known in the art.

Administration and Management

Security system 20 typically supports administration via a central management system. This system includes setup and configuration tools, and real-time monitoring of one or more deployed security systems. The management system typically includes monitoring capabilities such as:

display of network topology;
  display of security status of each managed element; and
  presentation of detailed attack information, including attack source and destination, severity, and timing.

The management system typically supports generation of reports such as:

top attackers;
  attack distribution by type; and
  network behavior statistics.

Network flood controller 60 and stateful connection controller 100 typically send notifications to the central management system based on the current states of the controllers. This approach generally minimizes the number of notifications sent, and prevents the administrator from being exposed to excessive unnecessary information.

Although some embodiments described above relate specifically to protection from attack in IP networks, based on particular transport- and application-layer protocols used in such networks, the principles of the present invention may be applied, mutatis mutandis, to protecting against attacks in other types of networks and using other protocols known in the art. It will thus be appreciated by persons skilled in the art that the present invention is not limited to what has been particularly shown and described hereinabove. Rather, the scope of the present invention includes both combinations and subcombinations of the various features described hereinabove, as well as variations and modifications thereof that are not in the prior art, which would occur to persons skilled in the art upon reading the foregoing description.

The invention claimed is:

1. A computer-implemented method for protecting a computer network, comprising:

monitoring communication traffic transmitted between clients outside the protected network and an application server inside the protected network over connections on the network that are associated with a stateful application protocol implemented by the application server;

implementing a state machine that tracks the connections between the clients and the application server, and makes transitions between state machine states based on application commands and replies generated by the clients and application server, in accordance with rules of the stateful application protocol, so as to detect respective application states of the connections;

analyzing a distribution of the application states so as to detect an attack on the application server; and filtering traffic entering the network in order to block traffic participating in the attack, wherein analyzing the distribution comprises interpreting as indicative of the attack a number of connections in one of the application states that is beyond a certain number of standard deviations from an average number of connections in the other application states.

2. The method according to claim 1, wherein monitoring comprises detecting respective application handshake states of the connections, and wherein analyzing comprises analyzing the distribution of the application handshake states so as to detect the attack.

3. The method according to claim 1, wherein the stateful application protocol includes Simple Mail Transfer Protocol (SMTP).

4. The method according to claim 1, wherein the stateful application protocol is selected from a list consisting of: Post Office Protocol (POP), Internet Message Access Protocol (IMAP), and File Transfer Protocol (FTP).

5. The method according to claim 1, wherein analyzing the distribution comprises interpreting a number of connections from a single source address that is greater than a threshold value as indicative of the attack.

6. The method according to claim 1, wherein analyzing the distribution comprises interpreting a deviation of the distribution from a baseline distribution of the application states as indicative of the attack.

7. The method according to claim 6, wherein analyzing the distribution comprises interpreting a disproportionately large number of connections in one of the application states compared to the baseline distribution as indicative of the attack.

8. The method according to claim 6, wherein the baseline distribution is a generally uniform distribution of the application states, and wherein analyzing the distribution comprises interpreting the deviation of the distribution from the generally uniform baseline distribution as indicative of the attack.

9. The method according to claim 8, wherein analyzing the distribution comprises interpreting a disproportionately large number of connections in one of the application states as indicative of the attack.

10. The method according to claim 1, wherein analyzing the distribution comprises calculating an average number of connections for each of the application states.

11. The method according to claim 10, wherein calculating the average number of connections comprises calculating the average number of connections for each of the application states on an aggregate basis for all source addresses of the traffic.

12. The method according to claim 10, wherein calculating the average number of connections comprises repeatedly calculating the average number for recent traffic.

13. The method according to claim 12, wherein calculating the average number of connections comprises applying Infinite Impulse Response (IIR) filtering.

14. The method according to claim 12, wherein calculating the average number of connections comprises calculating the average number using a moving window.

15. The method according to claim 1, wherein the connections are additionally associated with a transport layer protocol, and wherein analyzing the distribution comprises:
analyzing a pattern of the connections at the transport layer so as to detect a potential attack; and
analyzing the distribution of the application states so as to make a determination that the potential attack is the attack.

16. The method according to claim 1, wherein analyzing the distribution comprises:
measuring a time-related property of traffic entering the network;
transforming the time-related property of the traffic into a frequency domain; and
analyzing the distribution of the application states and the property in the frequency domain so as to detect the attack.

17. The method according to claim 16, wherein measuring the time-related property comprises measuring arrival times of packets, and wherein transforming the time-related property comprises determining a spectrum of packet arrival frequency.

18. Apparatus for protecting an application server inside a computer network in communication with clients outside the network, the apparatus comprising:
an interface; and
a network security processor, which is adapted to monitor, via the interface, communication traffic transmitted between the clients and the application server over connections on the network that are associated with a stateful application protocol implemented by the application server; to implement a state machine that tracks the connections between the clients and the application server, and makes transitions between state machine states based on application commands and replies generated by the clients and application server, in accordance with rules of the stateful application protocol, so as to detect respective application states of the connection; to analyze a distribution of the application states so as to detect an attack on the application server; and to filter traffic entering the network in order to block traffic participating in the attack, wherein the network security processor is adapted to interpret as indicative of the attack a number of connections in one of the application states that is beyond a certain number of standard deviations from an average number of connections in the other application states.

19. The apparatus according to claim 18, wherein the network security processor is adapted to detect respective application handshake states of the connections, and to analyze the distribution of the application handshake states so as to detect the attack.

20. The apparatus according to claim 18, wherein the stateful application protocol includes Simple Mail Transfer Protocol (SMTP).

21. The apparatus according to claim 18, wherein the stateful application protocol is selected from a list consisting of: Post Office Protocol (POP), Internet Message Access Protocol (IMAP), and File Transfer Protocol (FTP).

22. The apparatus according to claim 18, wherein the network security processor is adapted to interpret a number of connections from a single source address that is greater than a threshold value as indicative of the attack.

23. The apparatus according to claim 18, wherein the network security processor is adapted to interpret a deviation of the distribution from a baseline distribution of the application states as indicative of the attack.

24. The apparatus according to claim 23, wherein the network security processor is adapted to interpret a disproportionately large number of connections in one of the application states compared to the baseline distribution as indicative of the attack.

25. The apparatus according to claim 23, wherein the baseline distribution is a generally uniform distribution of the application states, and wherein the network security processor is adapted to interpret the deviation of the distribution from the generally uniform baseline distribution as indicative of the attack.

26. The apparatus according to claim 25, wherein the network security processor is adapted to interpret a disproportionately large number of connections in one of the application states as indicative of the attack.

27. The apparatus according to claim 18, wherein the network security processor is adapted to analyze the distribution by calculating an average number of connections for each of the application states.

28. The apparatus according to claim 27, wherein the network security processor is adapted to calculate the average number of connections for each of the application states on an aggregate basis for all source addresses of the traffic.

29. The apparatus according to claim 27, wherein the network security processor is adapted to repeatedly calculate the average number for recent traffic.

30. The apparatus according to claim 29, wherein the network security processor is adapted to calculate the average number of connections by applying Infinite Impulse Response (IIR) filtering.

31. The apparatus according to claim 29, wherein the network security processor is adapted to calculate the average number of connections using a moving window.

32. The apparatus according to claim 18, wherein the connections are additionally associated with a transport layer protocol, and wherein the network security processor is adapted to analyze the distribution by analyzing a pattern of the connections at the transport layer so as to detect a potential attack, and analyzing the distribution of the application states so as to make a determination that the potential attack is the attack.

33. The apparatus according to claim 18, wherein the network security processor is adapted to analyze the distribution by:
measuring a time-related property of traffic entering the network,
transforming the time-related property of the traffic into a frequency domain, and
analyzing the distribution of the application states and the property in the frequency domain so as to detect the attack.

34. The apparatus according to claim 33, wherein the network security processor is adapted to measure the time-related property by measuring arrival times of packets, and to transform the time-related property by determining a spectrum of packet arrival frequency.

35. A computer software product for protecting a computer network, the product comprising a tangible computer-readable medium in which program instructions are stored, which instructions, when read by a computer, cause the computer to monitor communication traffic transmitted between clients outside the protected network and an application server inside the protected network over connections on the network that are associated with a stateful application protocol implemented by the application server; to implement a state machine that tracks the connections between the clients and the application server, and makes transitions between state machine states based on application commands and replies generated by the clients and application server, in accordance with rules of the stateful application protocol, so as to detect respective application states of the connections; to analyze a distribution of the application states so as to detect an attack on the application server; and to filter traffic entering the network in order to block traffic participating in the attack, wherein the instructions cause the computer to interpret as indicative of the attack a number of connections in one of the application states that is beyond a certain number of standard deviations from an average number of connections in the other application states.

36. The product according to claim 35, wherein the instructions cause the computer to detect respective application handshake states of the connections, and to analyze the distribution of the application handshake states so as to detect the attack.

37. The product according to claim 35, wherein the stateful application protocol includes Simple Mail Transfer Protocol (SMTP).

38. The product according to claim 35, wherein the stateful application protocol is selected from a list consisting of: Post Office Protocol (POP), Internet Message Access Protocol (IMAP), and File Transfer Protocol (FTP).

39. The product according to claim 35, wherein the instructions cause the computer to interpret a number of connections from a single source address that is greater than a threshold value as indicative of the attack.

40. The product according to claim 35, wherein the instructions cause the computer to interpret a deviation of the distribution from a baseline distribution of the application states as indicative of the attack.

41. The product according to claim 40, wherein the instructions cause the computer to interpret a disproportionately large number of connections in one of the application states compared to the baseline distribution as indicative of the attack.

42. The product according to claim 40, wherein the baseline distribution is a generally uniform distribution of the application states, and wherein the instructions cause the computer to interpret the deviation of the distribution from the generally uniform baseline distribution as indicative of the attack.

43. The product according to claim 42, wherein the instructions cause the computer to interpret a disproportionately large number of connections in one of the application states as indicative of the attack.

44. The product according to claim 35, wherein the instructions cause the computer to analyze the distribution by calculating an average number of connections for each of the application states.

45. The product according to claim 44, wherein the instructions cause the computer to calculate the average number of connections for each of the application states on an aggregate basis for all source addresses of the traffic.

46. The product according to claim 44, wherein the instructions cause the computer to repeatedly calculate the average number for recent traffic.

47. The product according to claim 46, wherein the instructions cause the computer to calculate the average number of connections by applying Infinite Impulse Response (IIR) filtering.

48. The product according to claim 46, wherein the instructions cause the computer to calculate the average number of connections using a moving window.

49. The product according to claim 35, wherein the connections are additionally associated with a transport layer protocol, and wherein the instructions cause the computer to analyze the distribution by analyzing a pattern of the connections at the transport layer so as to detect a potential attack, and analyzing the distribution of the application states so as to make a determination that the potential attack is the attack.

50. The product according to claim 35, wherein the instructions cause the computer to analyze the distribution by:
measuring a time-related property of traffic entering the network,
transforming the time-related property of the traffic into a frequency domain, and
analyzing the distribution of the application states and the property in the frequency domain so as to detect the attack.

51. The product according to claim 50, wherein the instructions cause the computer to measure the time-related property by measuring arrival times of packets, and to transform the time-related property by determining a spectrum of packet arrival frequency.

* * * * *